United States Patent [19]
Andersen et al.

[11] Patent Number: 5,690,866
[45] Date of Patent: Nov. 25, 1997

US005690866A

[54] AUTOMATED METHOD FOR HYDRATING SOFT CONTACT LENSES

[75] Inventors: Finn Thrige Andersen, Vedbaek; Kaj Bjerre, Ballerup; Svend Christensen, Allinge, all of Denmark; Darren Scott Keene, Jacksonville, Fla.; Ture Kindt-Larsen, Holte, Denmark; Timothy Patrick Newton, Jacksonville, Fla.; Daniel Tsu-Fang Wang, Jacksonville, Fla.; Michael Francis Widman, Jacksonville, Fla.

[73] Assignee: Johnson & Johnson Vision Products, Inc., Jacksonville, Fla.

[21] Appl. No.: 463,360

[22] Filed: Jun. 5, 1995

Related U.S. Application Data

[63] Continuation of Ser. No. 258,556, Jun. 10, 1994, Pat. No. 5,476,111.

[51] Int. Cl.$^6$ .................................................. B29D 11/00
[52] U.S. Cl. ........................... 264/2.6; 425/808; 134/901
[58] Field of Search .................... 264/2.6; 425/808; 134/901

[56] References Cited

U.S. PATENT DOCUMENTS

| | | | |
|---|---|---|---|
| 4,786,444 | 11/1988 | Hwang | 425/808 |
| 5,080,839 | 1/1992 | Kindt-Larsen | 264/2.6 |
| 5,094,609 | 3/1992 | Kindt-Larsen | 264/2.6 |

*Primary Examiner*—Mathieu D. Vargot

[57] ABSTRACT

An automated method for high speed production rates in the hydration of soft contact lenses. The method includes the use of robotic transfer equipment to transfer contact lens molds containing contact lenses to and from a hydration station and a flushing station.

28 Claims, 23 Drawing Sheets

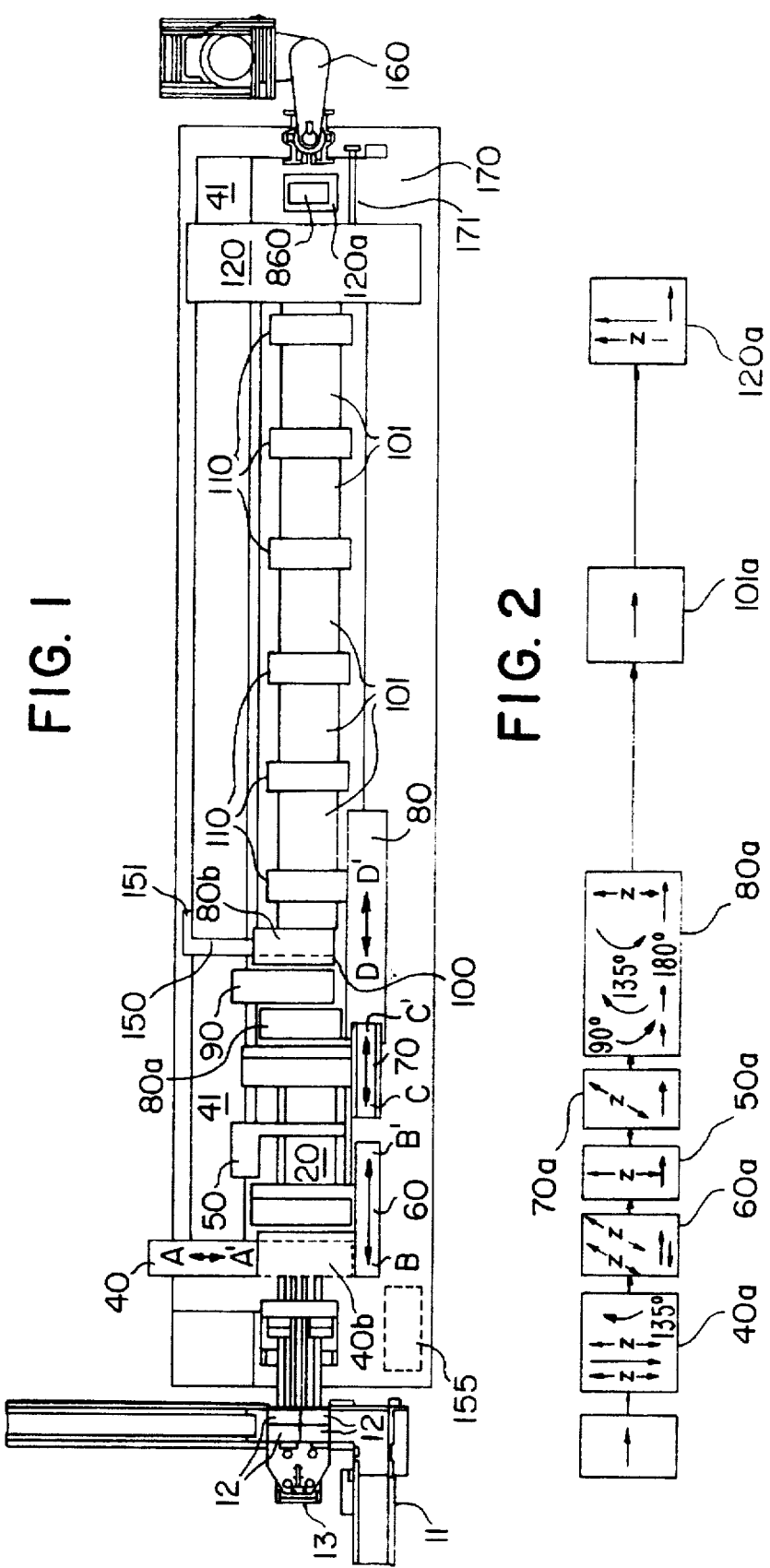

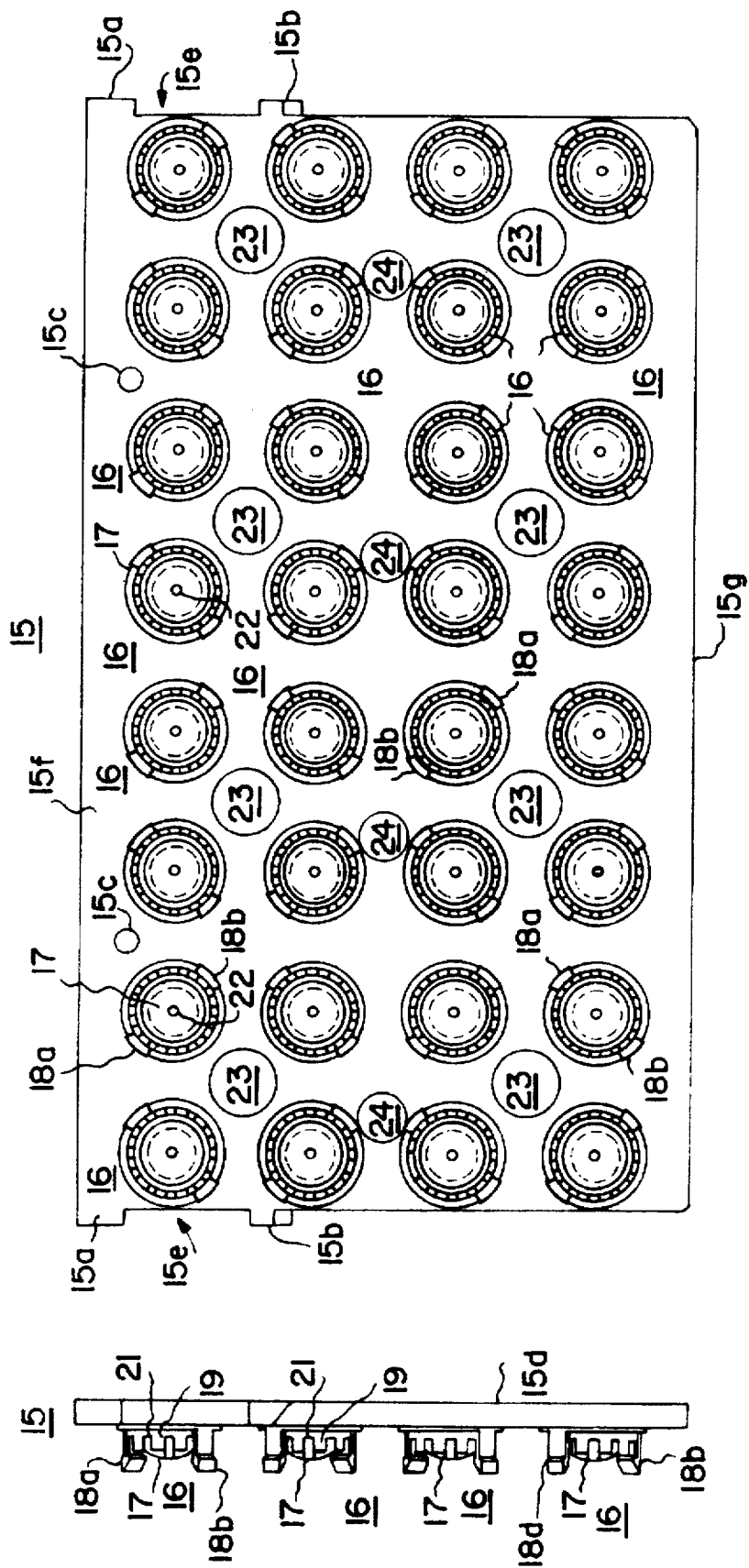

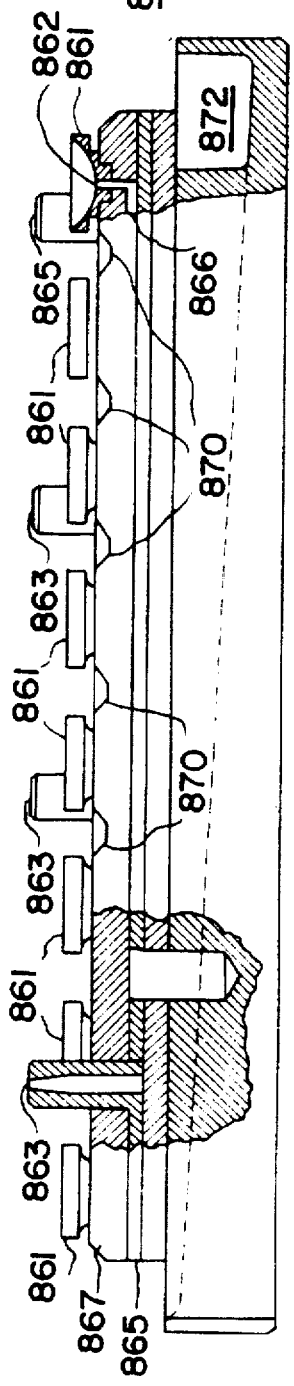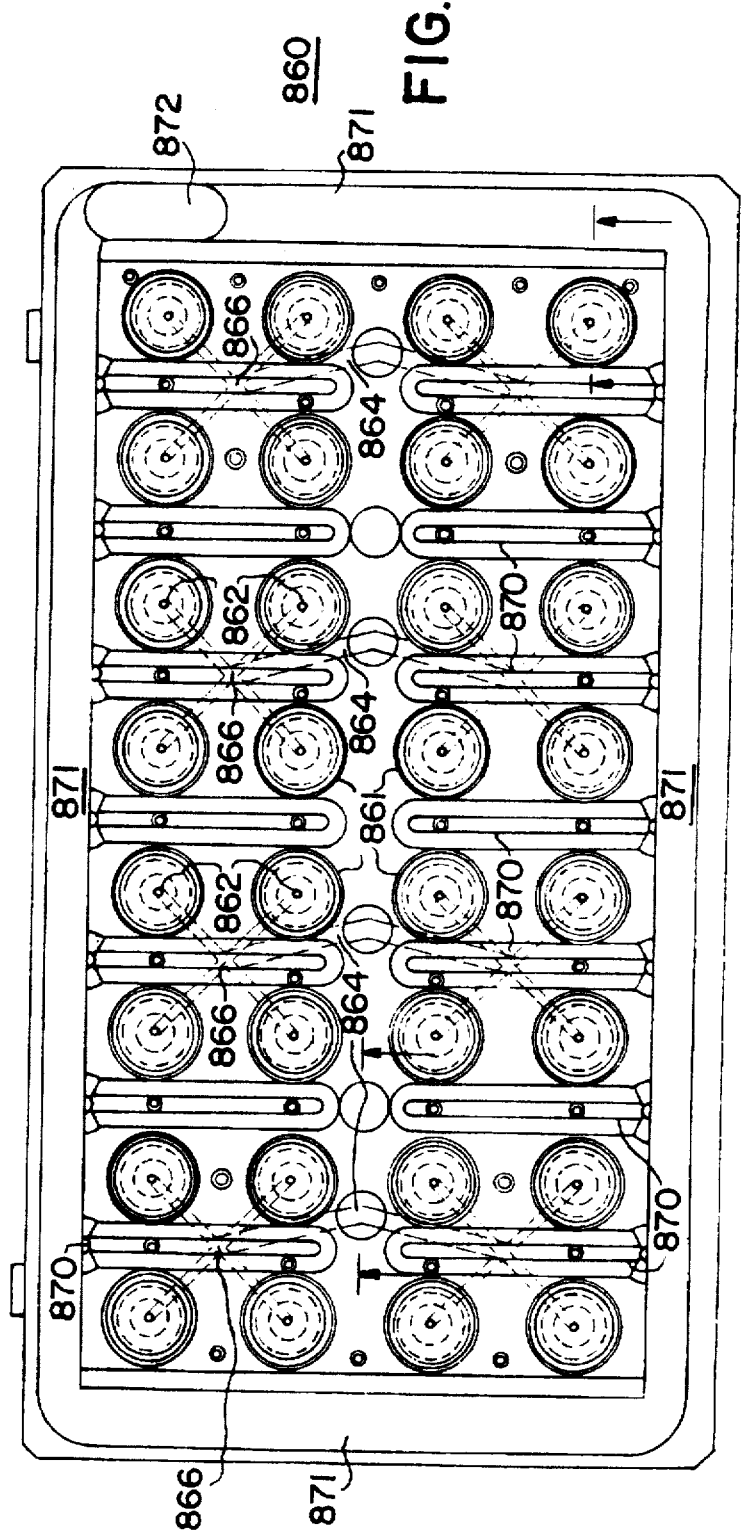

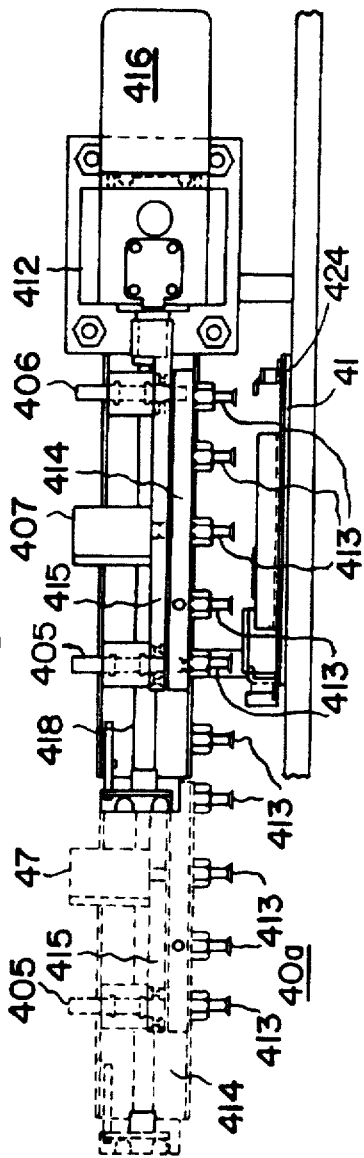
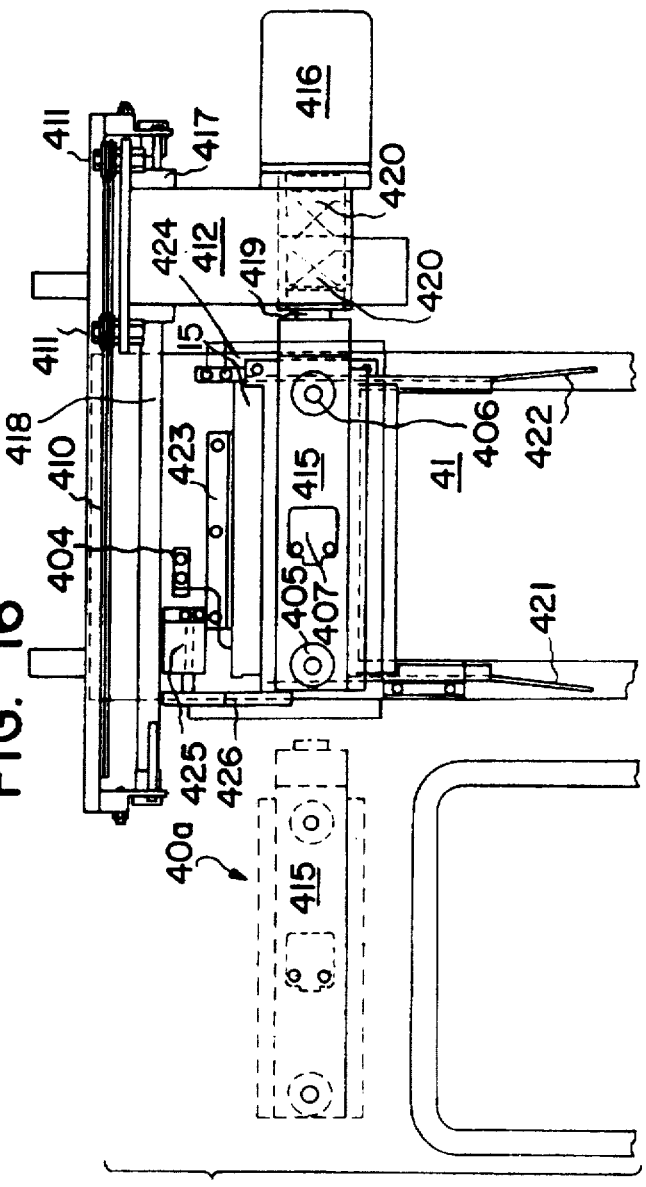
FIG. 15
FIG. 16

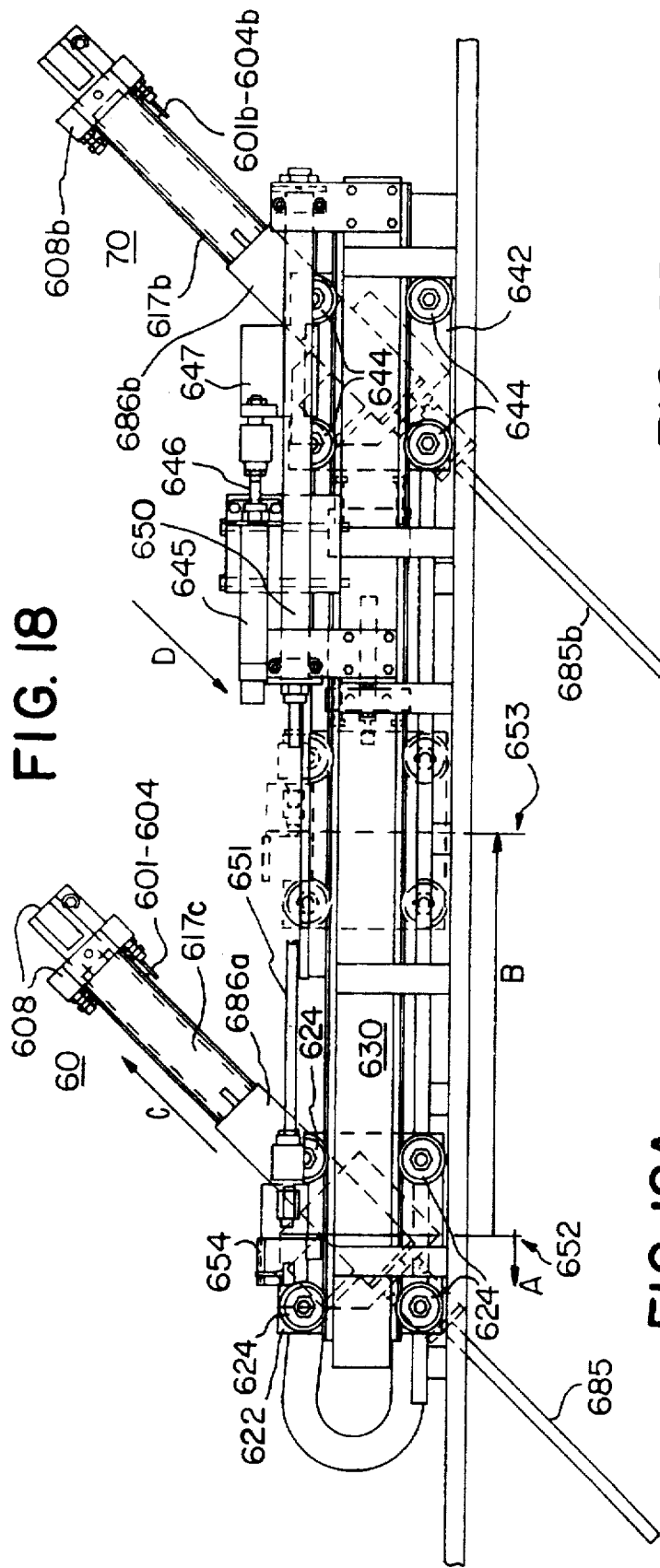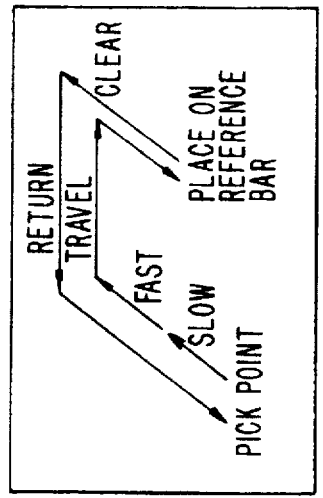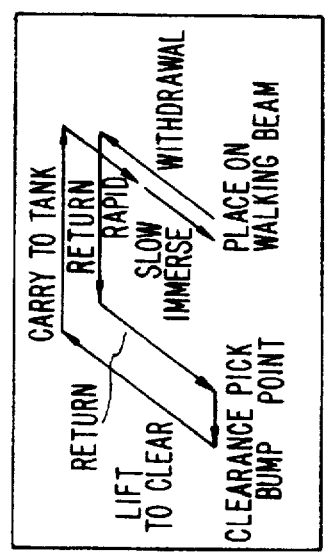

① Receive top chamber plate and front curves
② Backway for clearance
3. Rotate 90°,
4. Eject front curves, then
5. Rotate 150°
6. Move to Flush Station
7. Rotate 45° to drain and move to hand off position
8. Rotate 135° for hand off
9. Reciprocate head for hand off

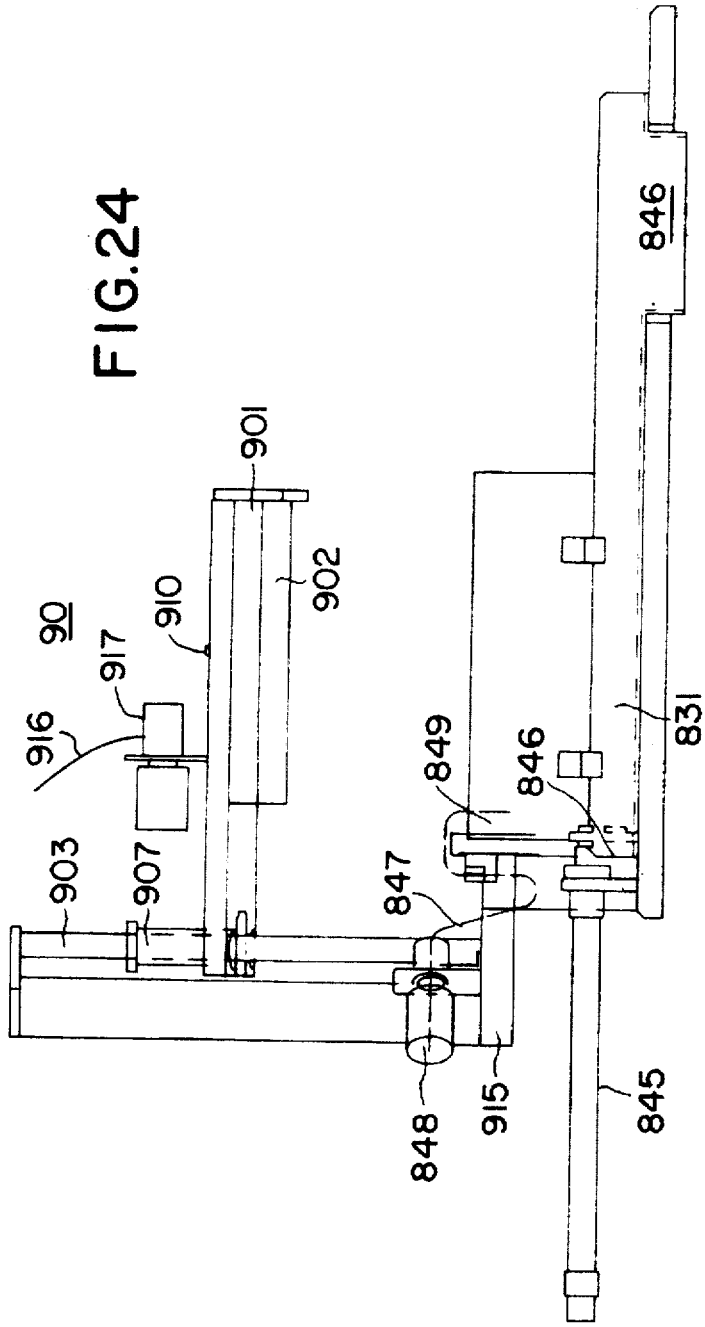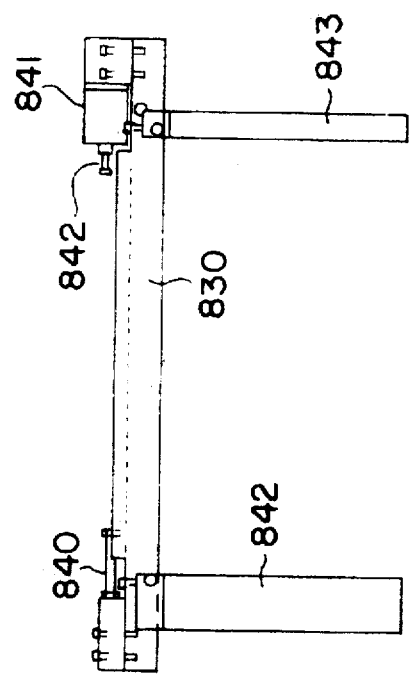

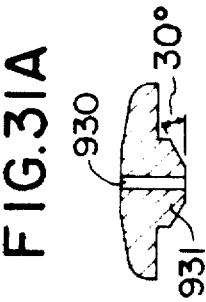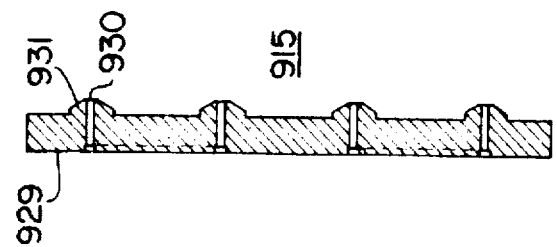
FIG.31A
FIG.31
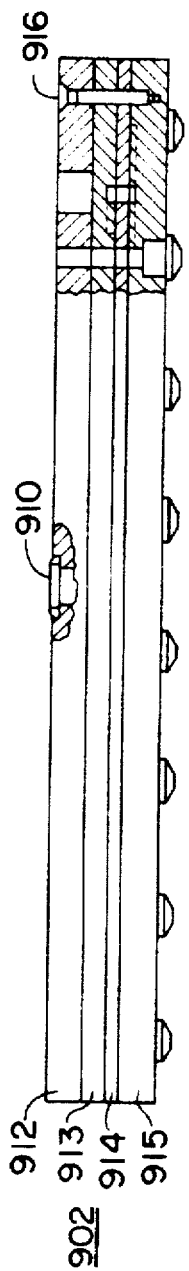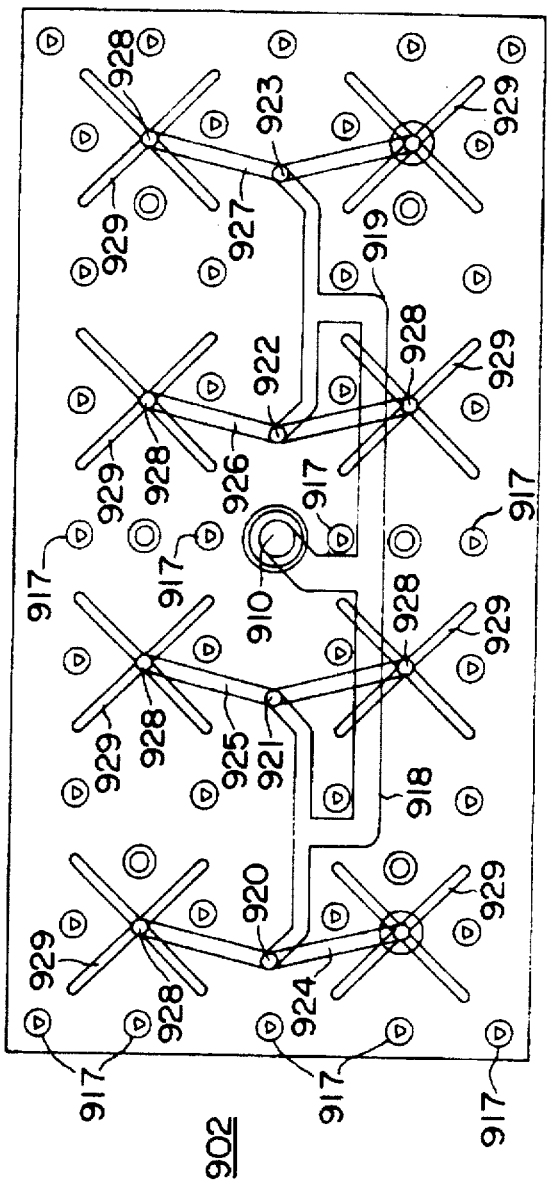
FIG.28
FIG.30

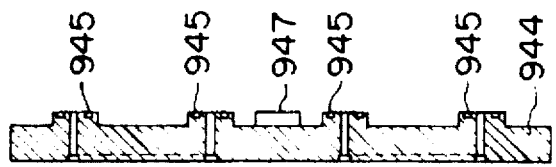
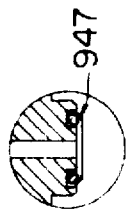
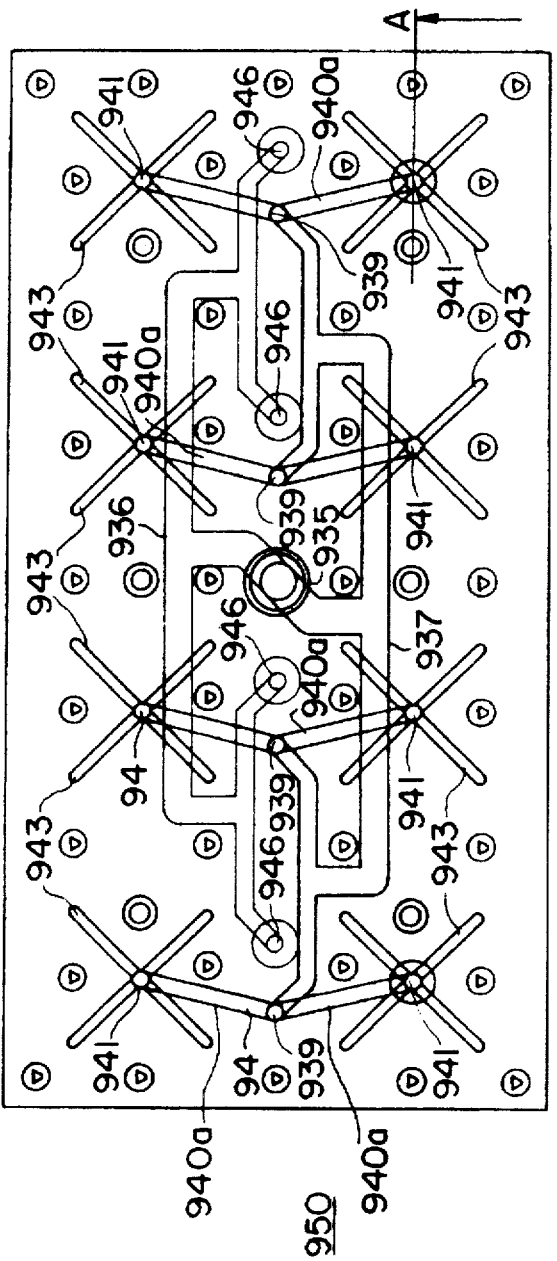
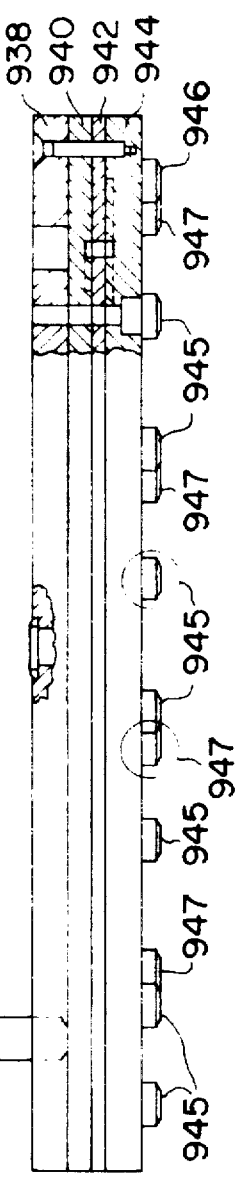

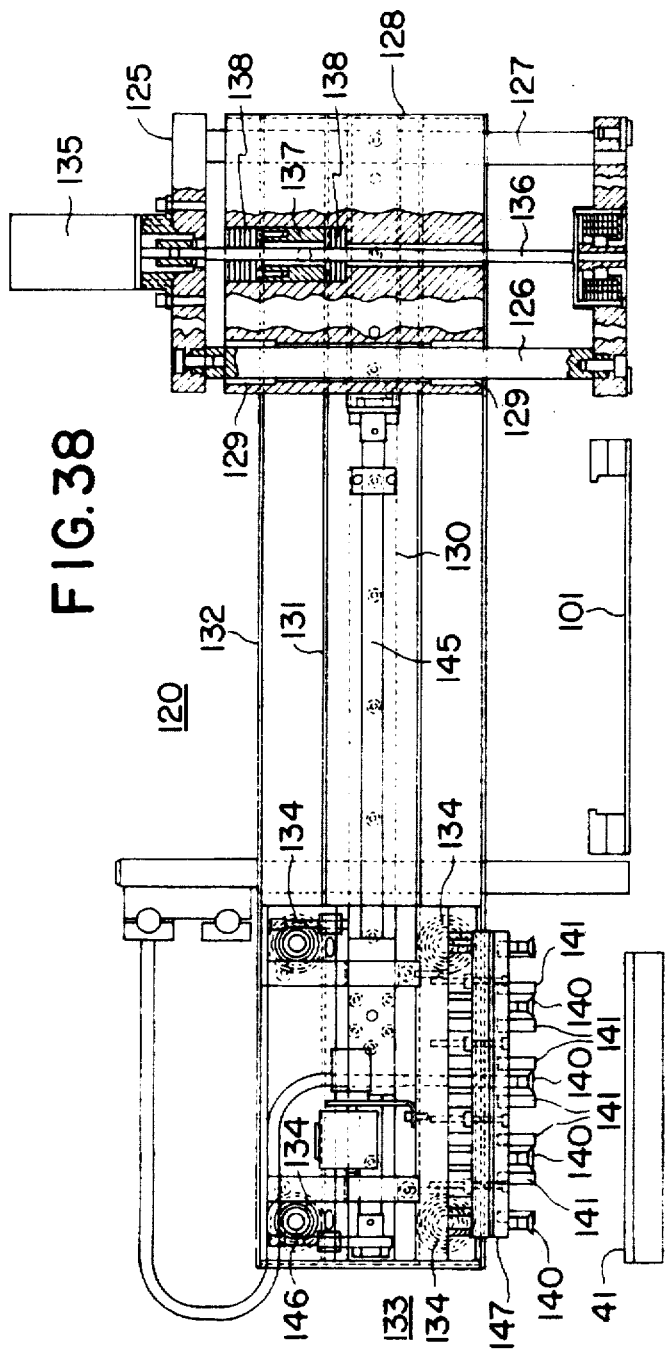
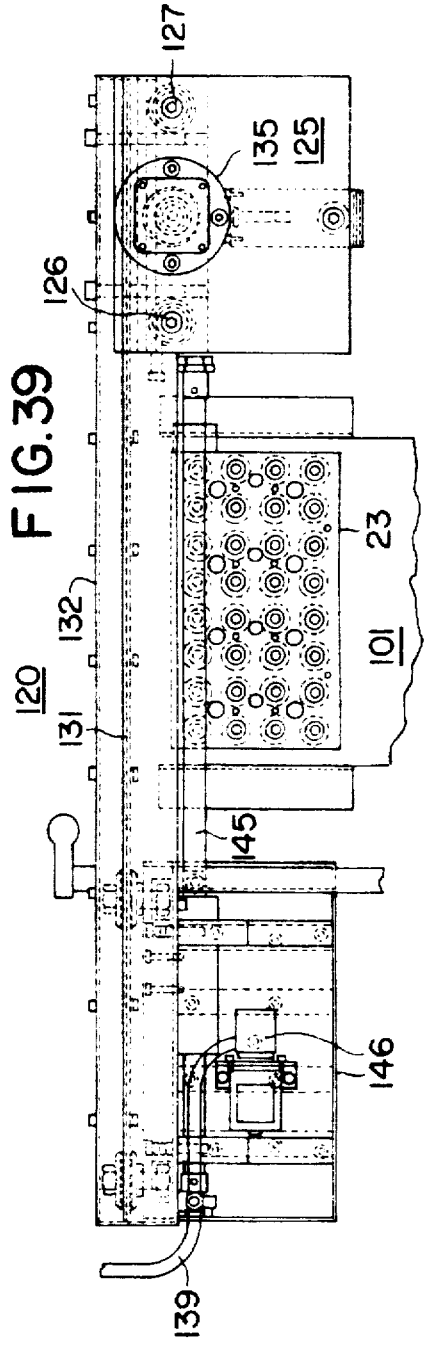
FIG.38
FIG.39

AUTOMATED METHOD FOR HYDRATING SOFT CONTACT LENSES

This is a continuation of application Ser. No. 08/258,556, filed on Jun. 10, 1994, now U.S. Pat. No. 5,476,111.

FIELD OF THE INVENTION

The present invention relates generally to the field of manufacturing ophthamalic lenses, especially molded, hydrophilic contact lenses, and more specifically, to a high speed automated method and apparatus for demolding and hydrating the lenses after polymerization.

DESCRIPTION OF THE PRIOR ART

The molding of hydrophilic contact lenses is disclosed in U.S. Pat. No. 4,495,313 to Larsen, U.S. Pat. No. 4,565,348 to Larsen, U.S. Pat. No. 4,640,489 to Larsen et al., U.S. Pat. No. 4,680,336 to Larsen et al., U.S. Pat. No. 4,889,664 to Larsen et al., and U.S. Pat. No. 5,039,459 to Larsen et al., all of which are assigned to the assignee of the present invention. This prior art discloses a contact lens production process wherein each lens is formed by sandwiching a monomer or a monomer mixture between a front curve (lower) mold section and a back curve (upper) mold section, carried in a 2×4 mold array. The monomer is polymerized, thus forming a lens, which is then removed from the mold sections and further treated in a hydration bath and packaged for consumer use. During polymerization, particularly of the hydrogels, the lens tends to shrink. To reduce shrinkage, the monomer is polymerized in the presence of an inert diluent like boric acid ester as described in the above patents, which fills up the spaces in the hydrogel lens during polymerization. The diluent is subsequently exchanged for water during the hydration process.

The prior art process of exchanging the diluent for water and hydrating the lens has been very time consuming. The two part molds are opened and the lenses are assembled in large groups and placed in a leaching tank for several hours. The leach tank includes heated water, small amounts of surfactants and salts. When the lenses are inserted in the leach tank they immediately expand in the presence of water and release from the mold in which they were molded. The boric acid ester diluent hydrolizes into glycerol and boric acid leaving the water behind in the matrix of the lens to thus exchange diluent for water to hydrate the lens.

Salts and a pH buffer are used in the water so that the water placed in a lens has an osmolality and pH substantially similar to that of human tears so that the lens will not irritate the eye when it is inserted by the user. If the polymer from which the lens is made has ionic characteristics, the buffer neutralizes any ionic species in the lens. That neutralization causes temporary destabilization of the dimensions of the lens and requires an extended period of time to complete.

The lenses are then transferred to a rinse tank where removal of diluent and surfactant continues for another extended period of time. The lenses are then transferred to a large equilibration tank filled with heated water and salts for completion of diluent and surfactant removal and equilibration of the lens for several more hours. The equilibration step entails completion of the neutralization of any ionic species in the polymer from which the lens is made. The lens is then removed from the equilibration tank and rinsed in clean saline and transferred for inspection and packaging.

U.S. Pat. Nos. 5,080,839 and 5,094,609 disclose respectively a process for hydrating soft contact lenses and a chamber for hydrating contact lenses which represent a substantial improvement over the foregoing prior art process. These patents teach the use of a unique chamber formed of a male and female member which forms a hydration cavity which permits the hydration of the lens without permitting it to invert or roll over. Fluid flow is introduced into the cavity about the lens from each side to extract leachable material from the lens. The process significantly reduces the amount of leaching fluid that is used and the amount of time that is needed for hydration, washing and extraction. The apparatus disclosed in these patents enabled placement on a frame suitable for automated handling. The process significantly reduced the through-put time by hydrating the lens and releasing the lens from the mold cavity with deionized water and a small amount of surfactant without any salts, so that the time consuming ionic neutralization of the polymer from which the lens blank is made does not occur during the hydration process. When deionized water is used, the final step of the process is to introduce buffered saline solution into the final package with the lens and then sealing the lens within the package so that final lens equilibration (ionic neutralization, final hydration and final lens dimensioning) is accomplished in the package at room temperature or during sterilization.

As taught in these prior art references, the use of deionized water is an important step in this process because it allows the time consuming ionic neutralization to be done essentially outside the hydration process after the lens has been packaged and sealed.

While the chamber and process described in the foregoing patents enabled automated handling of the lens during hydration, suitable automated equipment to handle these chambers at high production rates and implement this process in a fully automated apparatus was not readily available or taught by the prior art.

SUMMARY OF THE INVENTION

It is therefore an object of the present invention to provide an automated process and apparatus that will enable high production rates in the hydration process disclosed in U.S. Pat. No. 5,080,839. It is a further object of the present invention to provide a high speed robotic apparatus to facilitate the handling and manipulation of lens molds having a molded hydrophilic contact lens therein and the chambers described in U.S. Pat. No. 5,094,069 in a high through-put, high production rate automated apparatus.

It is an object of the present invention to provide an automated means for hydrating a molded hydrophilic contact lens wherein a first robotic assembly removes a plurality of contact lens molds from a production line carrier, wherein each of the lens molds has a contact lens adhered thereto. The first robotic assembly assembles the molds with a lens transfer means to form a first hydration carrier, and then hands the first hydration carrier to a second robotic assembly which immerses the first hydration carrier in a hydration bath to hydrate the lens and to release the lens from the lens mold. During transit through the hydration bath, the lens is transferred from the mold to the lens transfer means. After a predetermined period of time, the second robotic assembly removes the first hydration carrier from the hydration bath and hands the carrier off to a third robotic assembly which removes the molds from the lens transfer means, flushes the lenses carried on the lens transfer means and then transports the lens transfer means and lenses to a second hydration carrier to form a second hydration carrier for the extraction/flushing/hydration of the lens in subsequent processing stations. The second hydration carrier is then transported through a plurality of flushing stations wherein fresh deionized water is introduced into the hydration chambers at each hydration station to flush leachable substances from the hydration chamber. During transit travel between flushing stations, the residual fluid in the hydration chamber extracts impurities from the contact lens through mass transfer exchange. At each flushing station, fresh deionized water is introduced into the hydration chamber to remove previously extracted impurities and the products of hydrolysis. Finally, a final robotic assembly separates lens transfer means from the hydration base, to provide fully hydrated lenses in a concave lens holding means ready for inspection and packaging.

It is an object of the present invention to provide a method and apparatus for the high speed robotic handling of soft, wet and slippery contact lenses, primarily through fluid flow devices, which transport the lens and move it from carrier to carrier without physically damaging the lens, losing the lens, or allowing it to invert or roll over.

It is also an object of the present invention to provide a method for handling the lenses which will minimize the formation of air bubbles which might otherwise impair subsequent handling of the lens in a fluid transfer media.

It is further an object of the present invention to provide a robotic handling device that will quickly and efficiently secure a large number of discreet individual molds having a molded contact lens therein, and then eject said discreet mold parts after said lens has been released and transferred to a lens carrier. It is further an object of the present invention to provide a high speed robotic device for handling a plurality of contact lenses which secures the contact lenses to the lens carrier elements with surface tension, and releases the lenses from the carrier elements via fluid flow of air or water.

It is another object of the present invention to provide a device for transporting a plurality of first hydration carriers through a hydration bath from a first pick and place robotic assembly to a second pick and place robotic assembly which removes the first hydration carrier from the hydration bath.

It is another object of the present invention to provide an automated control means for sequencing and coordinating each of the robotic assemblies used in the transfer of lenses from the production line pallet, through hydration and extraction stations, and finally to an inspection carrier.

While the invention is described with particular reference to molded contact lenses wherein the lens is molded between a first and second mold half, it is understood that the hydrating apparatus is equally suitable for the hydration of lenses formed by lathe cutting wherein the hydrogel is maintained in a dry state while the desired optical surfaces are cut and polished. Further, the process may be used with spin cast lenses which subject a liquid monomer to a centrifugal force in a mold which has the same shape as the desired optical surface of the lens.

It is an object of the present invention to provide an automated process and apparatus for hydrating contact lenses where the volume of solution used to release and hydrate the lens is significantly reduced, and to significantly reduce the quantity of chemicals used in the hydration process.

It is another object of the present invention to provide a high speed automated apparatus and method to remove leachable substances with water, alcohol, or other organic solvents, or a mixture thereof, thus flushing unreacted monomers, catalysts and/or partially reacted comonomers, diluents or other impurities from a hydrophilic contact lens.

Finally, it is an object of the present invention to provide a high speed automated method and apparatus for hydrating contact lenses formed in an automated production line as more fully described in Application Serial No. 08/258,654, of W. A. Martin, et al. entitled "Consolidated Contact Lens Molding", the disclosure of which is incorporated herein by reference thereto.

BRIEF DESCRIPTION OF THE DRAWINGS

The foregoing objects and advantages of the present invention for an automated method and apparatus for hydrating soft contact lenses may be more readily understood by one skilled in the art with reference being had to the following detailed description of the preferred embodiments, taken in conjunction with the accompanied drawings, wherein like elements are designated by identical reference numerals throughout the several views, and in which:

FIG. 1 is a top plan view of the apparatus of the present invention illustrating in block form the arrangement and relative location of each of the robotic handling devices of the present invention.

FIG. 2 is a schematic illustration of the relative motion imparted by each of the robotic handling devices as the lenses are transported through the hydration apparatus of the present invention.

FIG. 4 is a planar view of the top chamber plate which is utilized as a lens transfer device in the present invention.

FIG. 5 is an end view of the top chamber plate illustrated in FIG. 4.

FIG. 6 is a partially cross-sectioned side or elevation view of a hydration base carrier utilized in the present invention.

FIG. 7 is a top or plan view of the hydration base carrier illustrated in FIG. 6.

FIG. 15 is an elevation and diagrammatic view of a first pick and place robotic assembly used in the present invention.

FIG. 16 is a top plan view of the first robotic pick and place unit illustrated in FIG. 15.

FIG. 18 is a elevation side view of a second robotic assembly of the present invention having first and second pick and place units.

FIG. 18(a) is a diagrammatic illustration of the movement of the first pick and place unit of the second robotic assembly illustrated in FIG. 18.

FIG. 18(b) is a diagrammatic illustration of the movements of a second pick and place unit of the second robotic assembly illustrated in FIG. 18.

FIG. 24 is an elevation end view of a lens flushing station utilized in the present invention.

FIG. 26 is an end elevation view of an indexing or alignment guide utilized in the present invention.

FIG. 28 is a partially cross-sectioned elevation view of a flushing manifold utilized in the flushing station of FIGS. 24 and 25.

FIG. 30 is a planar view of the manifold illustrated in FIGS. 28 and 29 illustrating diagrammatically the innerconnections between manifold levels.

FIG. 31 is a side elevation view in cross-section of level 1 of the manifold illustrated in FIGS. 29(a) and 28.

FIG. 31(a) is an enlarged cross-sectional view of a portion of FIG. 31.

FIG. 34 is a diagrammatic plan view of a manifold utilized in the hydration extraction station of FIG. 32.

FIG. 35 is a partially cross-sectioned view of the manifold illustrated in FIG. 34.

FIG. 35(a) is an enlarged cross-sectional view of a portion of FIG. 35.

FIG. 36 is a cross-sectional end view of one layer of the manifold illustrated in FIGS. 34 and 35.

FIG. 38 is a cross-sectioned elevation end view of the separation station illustrated in FIG. 37.

FIG. 39 is a cross-sectioned top planar view of the separation station illustrated in FIGS. 37 and 38.

DETAILED DESCRIPTION OF THE PREFERRED EMBODIMENTS

Figure 3:
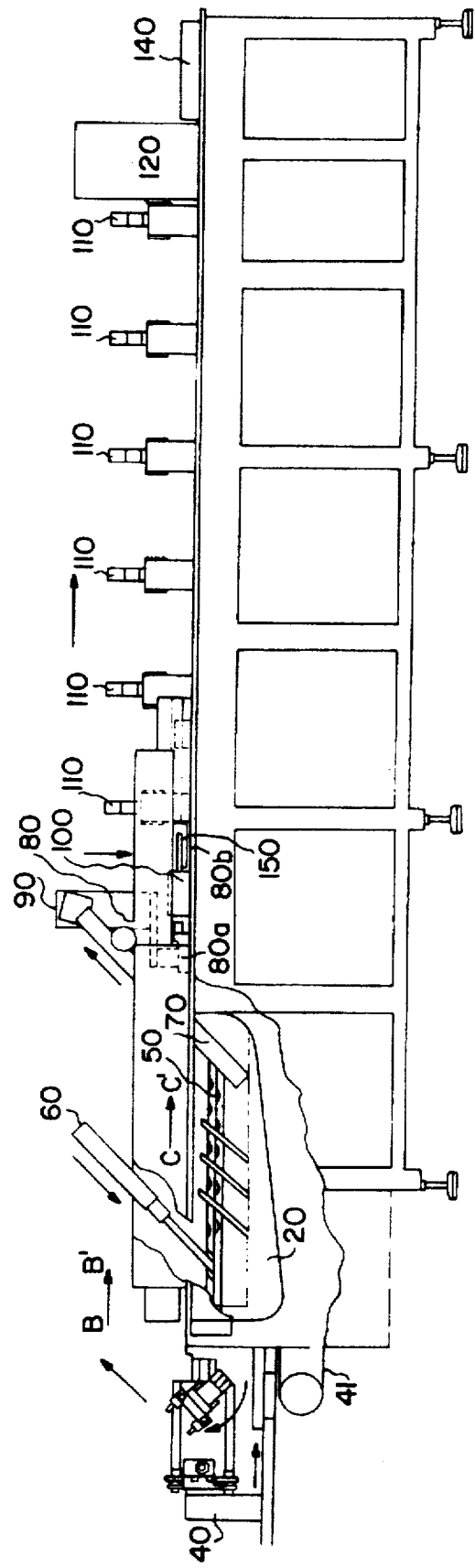
FIG. 3 is an elevation view of the apparatus illustrated in FIG. 1 illustrating in block form and schematic form the principle components of the present invention.

The present invention is an automated method and apparatus for hydrating soft contact lenses, especially molded hydrophilic contact lenses manufactured in two-part molds in the presence of a diluent and then polymerized in the presence of a catalyst with ultraviolet light. After the polymerization process is completed, the two halves of the mold are separated or demolded with the contact lens preferentially adhered to the front curve mold half, as more fully described in Application Ser. No. 08/258,654, of W. A. Martin et al. entitled "Consolidated Contact Lens Molding". While the invention described herein is preferentially utilized in combination with the automated production line disclosed therein, it is understood that the present invention is equally suitable for the hydration of lenses formed by lathe cutting wherein the hydrogel is maintained in a dry state while the desired optical surfaces are cut and polished, or with contact lenses formed by the spin cast method wherein a liquid monomer is subjected to centrifugal force in a mold which has the same shape as the desired optical surface of the lens.

The present invention is particularly suited to the hydration of hydrophilic contact lenses formed from monomer and monomer mixtures which include copolymers based on 2-hydroxyethyl methacrylate ("HEMA") and one or more comonomers such as 2-hydroxyethyl acrylate, methyl acrylate, methyl methacrylate, vinyl pyrrolidone, N-vinyl acrylamide, hydroxypropyl methacrylate, isobutyl methacrylate, styrene, ethoxyethyl methacrylate, methoxy triethyleneglycol methacrylate, glycidyl methacrylate, diacetone acrylamide, vinyl acetate, acrylamide, hydroxytrimethylene acrylate, methoxyethyl methacrylate, acrylic acid, methacryl acid, glyceryl methacrylate, and dimethylamino ethyl acrylate.

Preferred polymerizable compositions are disclosed in U.S. Pat. No. 4,495,313 to Larsen, U.S. Pat. No. 5,039,459 to Larsen et al. and U.S. Pat. No. 4,680,336 to Larsen et al., which include anhydrous mixtures of a polymerizable hydrophilic hydroxy ester of acrylic acid or methacrylic acid and a polyhydric alcohol, and a water displaceable ester of boric acid and a polyhydroxyl compound having preferably at least 3 hydroxyl groups. Polymerization of such compositions, followed by displacement of the boric acid ester with water, yields a hydrophilic contact lens.

The polymerizable compositions preferably contain a small amount of a cross-linking agent, usually from 0.05 to 2% and most frequently from 0.05 to 1.0%, of a diester or triester. Examples of representative cross linking agents include: ethylene glycol diacrylate, ethylene glycol dimethacrylate, 1,2-butylene dimethacrylate, 1,3-butylene dimethacrylate, 1,4-butylene dimethacrylate, propylene glycol diacrylate, propylene glycol dimethacrylate, diethylglycol dimethacrylate, dipropylene glycol dimethacrylate, diethylene glycol diacrylate, dipropylene glycol diacrylate, glycerine trimethacrylate, trimethylol propane triacrylate, trimethylol propane trimethacrylate, and the like. Typical cross-linking agents usually, but not necessarily, have at least two ethylenically unsaturated double bonds.

The polymerizable compositions generally also include a catalyst, usually from about 0.05 to 1% of a free radical catalyst. Typical examples of such catalysts include lauroyl peroxide, benzoyl peroxide, isopropyl percarbonate, azobisisobutyronitrile and known redox systems such as the ammonium persulfate-sodium metabisulfite combination and the like. Irradiation by ultraviolet light, electron beam or a radioactive source may also be employed to catalyze the polymerization reaction, optionally with the addition of a polymerization initiator. Representative initiators include camphorquinone, ethyl-4-(N,N-dimethylamino)benzoate, and 4-(2-hydroxyethoxy)phenyl-2-hydroxyl-2-propyl ketone.

Polymerization of the monomer or monomer mixture in the mold assembly is preferably carried out by exposing the composition to polymerization initiating conditions. The preferred technique is to include in the composition, initiators which work upon exposure to ultraviolet radiation; and exposing the composition to ultraviolet radiation of an intensity and duration effective to initiate polymerization and to allow it to proceed. For this reason, the mold halves are preferably transparent to ultraviolet radiation. After the precure step, the monomer is again exposed to ultraviolet radiation in a cure step in which the polymerization is permitted to proceed to completion. The required duration of the remainder of the reaction can readily be ascertained experimentally for any polymerizable composition.

After the lens has been polymerized, it is demolded in preparation for the hydration process. The hydration process of the present invention is used to hydrolyze the diluent used in the monomer or monomer mixture and then extract or leach from the lens the products of hydrolysis, together with unreacted or partially reacted monomer or inhibitors, surfactants from the lens. In the hydration step, a plurality of lenses, still adhered to the mold in which they were formed, are immersed in a deionized water bath having a small amount of surfactant therein. The hydration bath hydrolizes the boric acid ester used as a diluent in the lens into glycerol and boric acid which is then exchanged by the physical phenomenon of mass transfer by the concentration gradient of the products of hydrolysis between the contact lens and the fluid in the hydration tank.

Simultaneously, the lens, in the presence of deionized water and surfactant, swells, creating a shear force with respect to the mold in which the lens was formed thereby separating the contact lens from the mold. After the contact lens and mold have been separated, they are removed from the hydration bath, the mold is discarded, and the lens is placed in a hydration chamber in a manner similar to that described in U.S. Pat. No. 5,094,609. While the lens is in the hydration chamber, deionized water is introduced through the chamber to periodically flush the chamber and permit extraction of impurities from the contact lens. As the extraction continues, the concentration gradient between the lens and each batch of fresh deionized water diminishes, and it is therefore useful to provide a residence time between each of the extraction stations. In the preferred embodiment of the invention, extraction is carried out in a series of discreet steps where fresh deionized water is introduced into the hydration cavity for approximately 2 seconds, while the residence time for leaching or mass transfer exchange continues for approximately 72 seconds between each extraction or washing station. After 6 such step-wise extraction steps, the products of hydrolysis, monomers and surfactants have been reduced below detectable levels.

In the process for the present invention, the wet contact lens is transferred by a variety of techniques, including gravity, surface tension, and fluids that are introduced through specialized lens transfer elements to transfer the lens from convex to concave lens holding surfaces, or vice versa. In the present invention, both air and water are utilized as suitable fluids. This avoids direct mechanical handling of the lens as it is transferred from chamber to chamber thereby minimizing physical damage to the lens.

SUMMARY OF OPERATION

FIGS. 1, 2 and 3 illustrate diagrammatically and in block form the preferred embodiment of the automated means for hydrating a mold and hydrophilic contact lens of the present invention. As illustrated in FIG. 1 an automated production line having an output conveyor 11 supplies a plurality of pallets 12 to a hydration transfer mechanism 13 which transfers four pallets at a time from the production line conveyor 11 to a first pick and place robotic assembly 40.

While any suitable pallet arrangement would be satisfactory, the invention is described with respect to hydration carriers that handle thirty-two lenses at once, taken from four separate production pallets simultaneously. This arrangement achieves a suitable compromise between a desirable batch size and convenient robotic handling, although it is understood that a variety of pallet configurations and lens arrangements would be suitable, depending on the output rate and configuration of the contact lens production line.

The first robotic assembly 40 has a plurality of motions generally illustrated in box 40(a) of FIG. 2 including a first up and down motion in the Z axis with respect to FIG. 1 which picks a top assembly plate (illustrated in FIG. 4) from a return conveyor 41 and lifts it from the conveyor for transport in the direction of A' on arrow A–A' to an assembly position 40(b).

For the purposes of explanation, the term X axis will refer to the horizontal axis of the Figure under discussion, the Y axis will refer to the vertical axis of the Figure under discussion, and the Z axis will be perpendicular to the plane of the Figure under discussion.

At the assembly position 40(b), the top chamber plate is again reciprocated downwardly in the Z axis with respect to FIG. 1 to engage a plurality of contact lens molds carried in pallets 12, wherein each of the molds has a molded contact lens therein. The first robotic assembly 40 and the top chamber plate then secure each of the individual molds with clips as will hereinafter be more fully described with respect to FIGS. 4, 5, 8 and 9 and then reciprocates both the plate and the molds upwardly in the Z axis for clearance. After achieving the desired clearance, the robotic assembly rotates the top chamber plate and molds 135° to an angle approximately 45° from the vertical for hand-off to the second robotic assembly. The top chamber plate 15 of FIGS. 4 and 5 and the associated contact lens molds 9 secured thereto form a first hydration carrier for the lenses to be hydrated.

As illustrated in FIGS. 1 and 3, a second robotic assembly including a first pick and place robot 60 and a second pick and place robot 70 are arranged on either end of a hydration tank 20. The first pick and place unit 60 takes the first hydration carrier from the first robotic assembly 40 and moves it upwardly in the Z axis (the Y axis in FIG. 3) at a 45° angle to clear the side of tank 20, and then reciprocates along the X axis in the direction of arrow B–B', from B to B' as illustrated in FIG. 1. The motions of pick and place unit 60 are illustrated in box 60(a) of FIG. 2. After the first pick and place unit 60 has reached the desired insertion point over hydration tank 20, the first hydration assembly is inserted into the tank at a 45° angle from the Z axis in FIG. 1 (the Y axis in FIG. 3) and released onto a walking beam assembly 50. Walking beam assembly 50 translates the first hydration carrier along the length of the hydration tank 20 with a gentle up and down motion in the Z axis of FIG. 1 as illustrated in the summary box 50(a) of FIG. 2. When it has reached the end of hydration tank 20, the second pick and place robot 70 reciprocates downwardly to engage the hydration carrier within the hydration bath and draw it upwardly at a 45° angle out of the hydration bath and then reciprocate in the X axis as indicated by the arrow C–C' in the direction of C to C' as more fully illustrated in the summary box 70(a) of FIG. 2. The second pick and place unit 70, carries the first hydration chamber to a fixed reference point where it is engaged by a third robotic assembly 80.

The motions of the third robotic assembly 80 are complex, and are summarized in box 80(a) of FIG. 2. In its first motion, the third robotic assembly secures the first hydration carrier and backs it away from the reference point and the second pick and place unit 70. The first hydration carrier is then rotated approximately 90° downwardly and the mold halves are ejected by ejector pins as will be hereinafter more fully described with respect to FIGS. 20–23. After removal of the mold halves at position 80(a), the top chamber plate and the contact lenses are reciprocated in the direction of arrow of D–D' in the direction of D to D' to rest under a flushing station 90. The flushing station 90 then descends to the top chamber plate and the contact lenses to flush the lenses prior to the next processing step. Contemporaneously therewith, the hydration base (illustrated in FIGS. 6 and 7) is extracted from the return conveyor 41 by means of an indexing assembly 100 and placed on a conveyor transport path at the position indicated by 80(b). After flushing, the third robotic assembly drains the flush water by tipping the top chamber plate, and then moves to a position above the hydration base. The third robotic assembly 80(a) then makes a third translation in the direction of arrow D–D' in the direction of D' to a point directly above position 80(b) and rotates 180°. When it has reached this position, it then descends downwardly in the Z axis of FIG. 1 to assemble the top chamber plate, and the contact lenses supported thereon, with the second hydration carrier at position 80(b). After assembly, the second hydration carriers are transported along transport path 101 through a plurality of extraction stations 110 by means of the indexing assembly 100.

Return assembly 150 includes an arm 151 which is suspended over return conveyor 41 at a height that will allow the top chamber plate to pass thereunder, and be transported to the first robotic assembly 40. The hydration base units, as illustrated in FIGS. 6 and 7, are higher, and will engage arm 150 and be held there. The hydration base is transferred from the return conveyor by pusher arm 151 to the index conveyor path 101 at position 80(b).

After the hydration base and top chamber plate have been assembled to form the second hydration carrier, index drive 100 pushes the carrier the distance of one carrier width in the direction of D' in arrow D–D'. When the next hydration base is received, the next second hydration carriers is formed and indexed down the index conveyor path 101. In this matter a row of second hydration carrier is formed on conveyor path 101, wherein each of the second hydration carriers are sequentially indexed, one carrier width at a time, to pass through each of the extraction stations 110, and thereby arrive at the separation station 120, following completion of hydration.

Each of the extraction stations 110 flushes the hydration chambers of the second hydration carrier and provides fresh deionized water for leaching exchange of the by-products of hydrolysis.

At the end of the automated apparatus, a fourth robotic assembly at separation station 120 separates top chamber plate 15 from the hydration base and returns it to the return conveyor 41 where it is conveyed back to the first robotic assembly 40. After separation, the hydration base is transported to position 120(a) by index drive 100 wherein the lenses are transferred for inspection and packaging by a fifth robotic assembly 160. After the lenses are removed, a pusher arm mechanism 170 returns the second hydration carrier to the return conveyor belt 41 with push arm 171 where it is recycled to the return assembly 150.

The top chamber plate 15 used to transfer the contact lenses from point to point is illustrated in FIGS. 4 and 5. The top chamber plate 15 is equipped with a frame 15(f) and a plurality of carrier elements 16 secured thereto. As illustrated in FIGS. 4 and 5, a total of 32 carrier elements are mounted on each transport plate enabling the transport plate to receive 32 contact lens molds from four separate pallets of the type illustrated in FIG. 8. Each of the carrier elements 16 includes a convex lens attachment surface 17 and a pair of clips 18(a), 18(b) which extend beyond a circumferential wall 19 having a plurality of openings 21 formed therein. While two clips are illustrated, three or four clips could be used if desired. In the preferred embodiment, these clips are formed of a liquid crystalline polymer. Each of the convex lens attachment surfaces includes a port 22 which may be used to introduce a fluid between the convex lens attachment surface and a contact lens carried thereon in order to release or flush the lens. The top chamber plate also includes eight openings 23 which provide an opening or entry path for ejector pins which will be used to remove the molds after the contact lens has been transferred from the lens mold to the convex lens attachment surface. Transport frame 15(f) also includes four fluid conduit openings 24 which will be subsequently used in connection with the second hydration carrier to provide fluid flow through top chamber plate to the hydration base unit 860, illustrated in FIGS. 6 and 7. The transport frame 15(f), illustrated in FIGS. 4 and 5, also includes first and second support tabs 15(a),15(b) which are used by the walking beam assembly 50 to transport the first hydration carrier through the hydration bath. The transport frame 15(f) also includes a pair of registration openings 15(c) that are used to register and secure the first hydration carrier to the pick and place units of the second robotic assembly.

Figure 9:
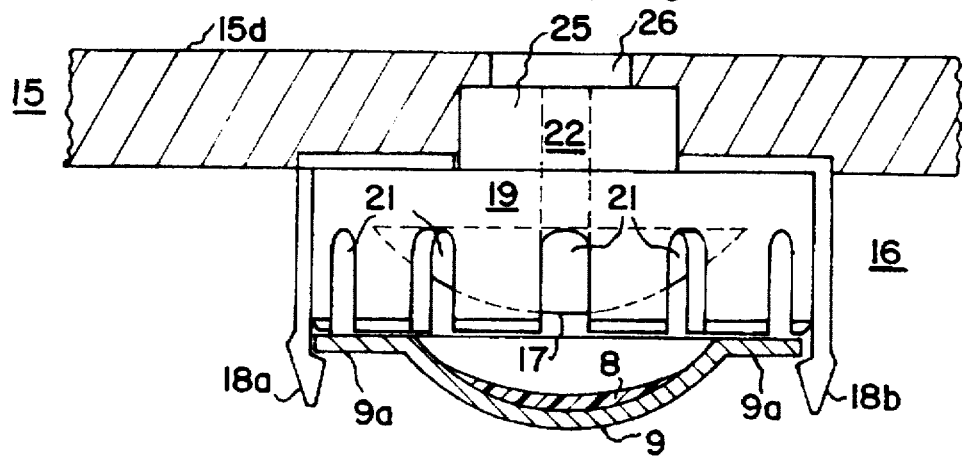
FIG. 9 is a partially cross-sectioned elevation view of a single lens transport means of the first hydration carrier, formed by the top chamber plate of FIGS. 4 and 5 with a contact lens mold and contact lens secured thereto for transport through a hydration bath.

The top chamber plate illustrated in FIGS. 4 and 5, when coupled with a plurality of lens molds as illustrated in FIG. 9, forms a first hydration carrier 22 to be utilized by the apparatus of the present invention for hydrating the contact lens secured therein.

Figure 10:
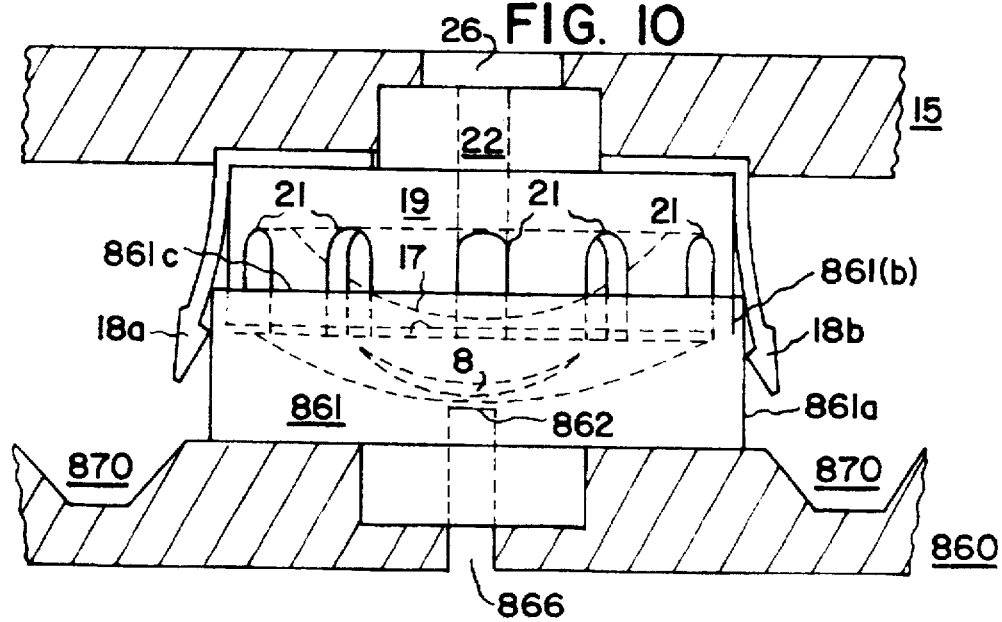
FIG. 10 is a partially cross-sectioned and elevation or side view of a single lens transport means of the second hydration carrier formed when the top chamber plate of FIGS. 4 and 5 is combined with the hydration base carrier of FIGS. 6 and 7.

As illustrated in FIG. 9, the carrier elements 16 are secured to the transport frame 15(f) by means of a boss 25 formed on the body of the carrier element 16. The fluid port 22 extends through the carrier element from the convex lens attachment surface 17 to a fluid opening 26 defined in transport frame 15(f). When the top chamber plate is combines with the hydration base, as illustrated in FIG. 10, a fluid opening 26 is used to mate with a fluid discharge nozzle formed on an extraction manifold as will be hereinafter subsequently described. The contact lens mold 9 having a contact lens 8, which was molded therein includes an annular flange member 9(a) which is gripped by clips 18(a),18(b) to secure the lens mold to carrier element 16.

Figure 8:
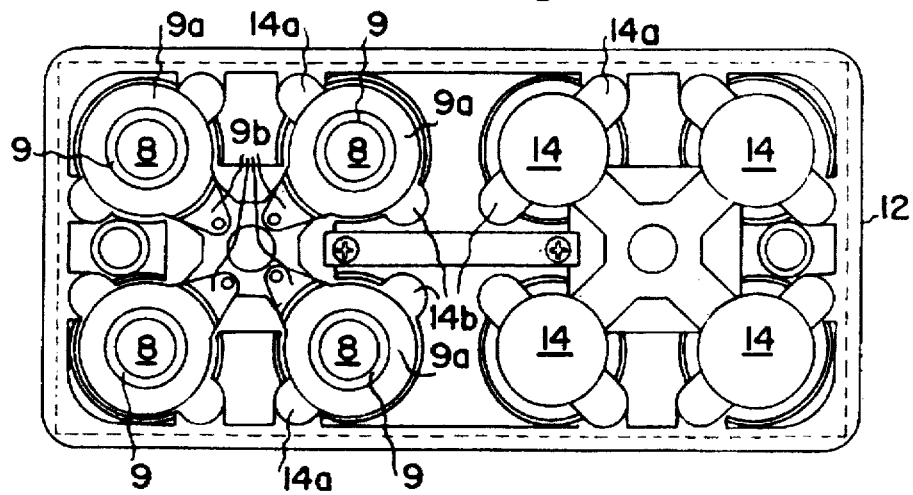
FIG. 8 is a top plan view of a production line pallet which may be used to provide contact lens molds and lenses from the automated production line to the present invention.

As illustrated in FIGS. 1 and 8, the contact lens molds 9 are transported to the hydration apparatus by means of a pallet carrier 12 which includes eight cavities 14 for receiving the concave body of front curve mold half 9. Extending radially outward on each side of cavity 14 are recesses 14(a),14(b) which provide clearance for the clip members 18(a),18(b) when the top chamber plate is lowered into engagement with the pallet 12 and molds halves 9. As will be hereinafter explained in more detail, the pallet carrier 13 transports four of the pallets 12 to a transfer position wherein the top chamber plate illustrated in FIGS. 4 and 5 is lowered into engagement with the pallets and molds to transfer the molds to the top chamber plate by means of clips 18(a),18 (b). After the clips 18(a),18(b) have engaged mold half 9, the mold chamber plate and molds 9 are lifted upwardly and inverted for transfer to the hydration tank by the first robotic assembly 40.

FIRST ROBOTIC ASSEMBLY

Figure 17A:
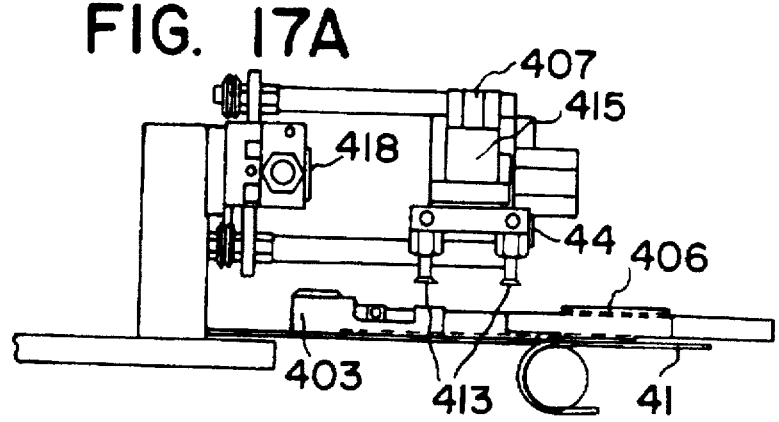
FIG. 17(a) is an end view of the first robotic pick and place unit illustrated in FIGS. 15 and 16 at an initial home position.
Figure 17B:
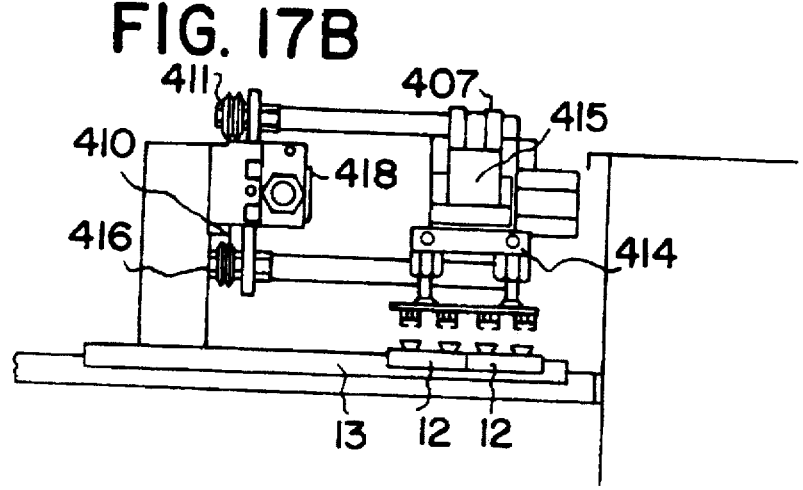
FIG. 17(b) is an elevational end view of the first robotic pick and place unit illustrated in FIGS. 15 and 16 immediately prior to the assembly of the top chamber plate and a plurality of contact lens molds.
Figure 17C:
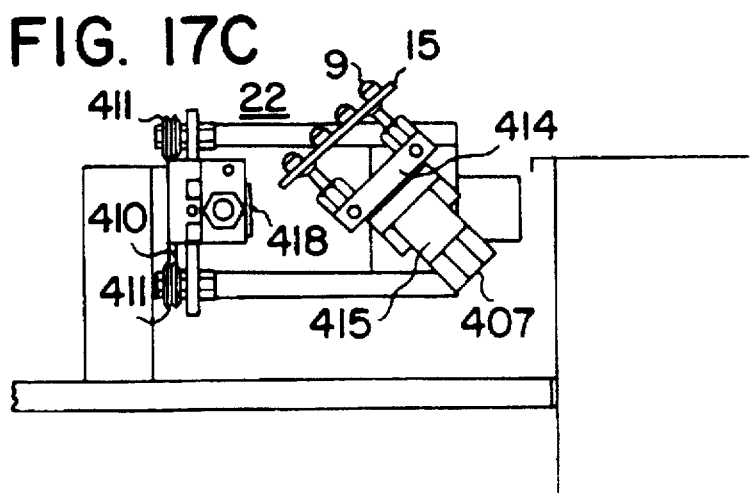
FIG. 17(c) is a diagrammatic elevation or end view of the first robotic pick and place assembly at its hand-off position.

The first robotic assembly 40 is more fully illustrated in FIGS. 15–17(c) wherein FIG. 15 is an elevation end view. FIG. 16 is a plan view and FIGS. 17(a)–(c) are elevation side views. The first robotic assembly includes a rotating transport head 415 which is illustrated in a first position in solid lines in FIGS. 15 and 16 and in a second position in dotted lines in FIGS. 15 and 16. In the first position, the first robotic assembly picks up a top chamber plate from conveyor 41 by means of a plurality of suction cups 413 and a reciprocal rotating platform 414 which reciprocates along a vertical axis on guide pins 405,406 by means of a pneumatic drive cylinder 407. The operation of the first robotic assembly is controlled by a PLC control means indicated schematically as 155 in FIG. 1. As the top chamber plates are returned along conveyor 41, they first encounter fixed guides 421,422 which guide them into a fixed reference surface. A sensor mechanism 424 then triggers a pneumatic cylinder 425 and a pusher arm 426 which urges the top chamber plate into engagement with a second fixed reference 427, thereby assuring the first robotic assembly of precise positioning of the top chamber plate prior to pickup.

After the top chamber plate 15 has been securely positioned, pneumatic cylinder 407 is actuated, and the reciprocal platform 414 begins its downward descent until the suction cup members 413 engage the top chamber plate. Suction cup grippers 413 are connected to a vacuum line to provide a positive vacuum grip. After the top chamber plate has been securely engaged, pneumatic cylinder 407 is reversed, and the top chamber plate is lifted free of conveyor 41 and movable carriage 412 is then translated by means of guide rail 410 and rollers 411 to the assembly position 40(a) for pick up of the contact lens molds as illustrated in FIG. 17(b). The carriage member 412 is reciprocated along guide rail 410 by a rodless cylinder drive mechanism 418 which reciprocates the carriage 412 to translate the rotating carriage 415 to the position over pick up point 40(a) as illustrated in FIG. 17(b). Drive cylinder 407 is then actuated again and the reciprocal rotating carriage 414 is driven downwardly so that the clip members 18(a),18(b) on each of the carrier elements engages the outer annular flange 9(a) of the front curve mold as previously described with respect to FIG. 9. After engagement, pneumatic cylinder 407 is reversed, and the rotating reciprocal carriage 414 is lifted, thereby lifting each of the front curve mold halves from the production line pallets 12 and the transfer carrier 13. Once clearance is achieved, drive motor 416 is actuated which rotates the rotating platforms 414,415 as illustrated in FIG. 17(c) through 135° of arc. When the rotating head 415 has completed its rotational travel, first hydration assembly 22, including a top chamber plate 15 and molds 9 is now in position for pick up by the second robotic assembly. Motor 416 is fixably attached to reciprocating carriage 412 and rotates the rotatable platforms 414,415 by means of shaft 419 and bearing members 420, illustrated schematically in FIG. 16.

THE SECOND ROBOTIC ASSEMBLY

The second robotic assembly includes a pair of pick and place units 60,70 positioned on either end of the hydration tank, and a walking beam assembly 50 for moving each of the first hydration carriers through the hydration tank. The walking beam assembly is illustrated in FIGS. 11–14, while the first and second pick and place units 60,70 are illustrated in FIGS. 18–19.

Figure 11:
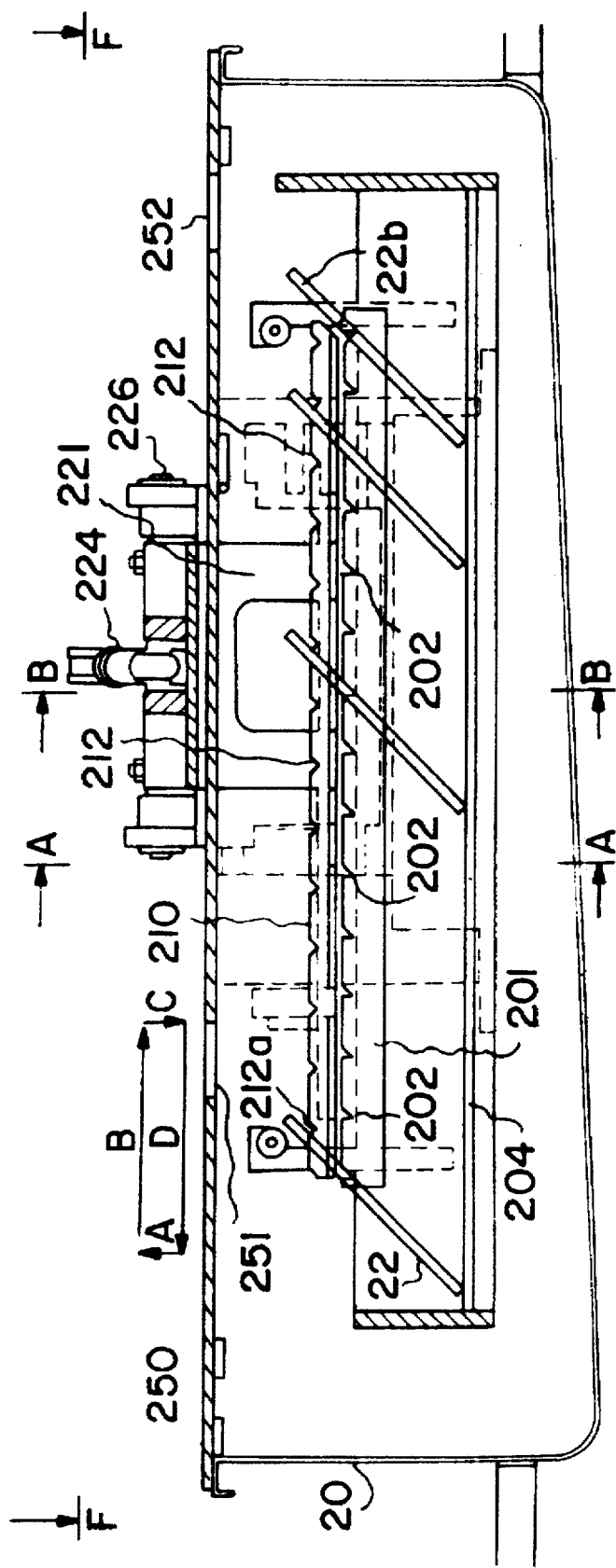
FIG. 11 is a partially cross-sectioned side view of the hydration tank of the present invention illustrating in elevation, a walking beam mechanism which transports the first hydration carrier through the hydration tank of the present invention.
Figure 12:
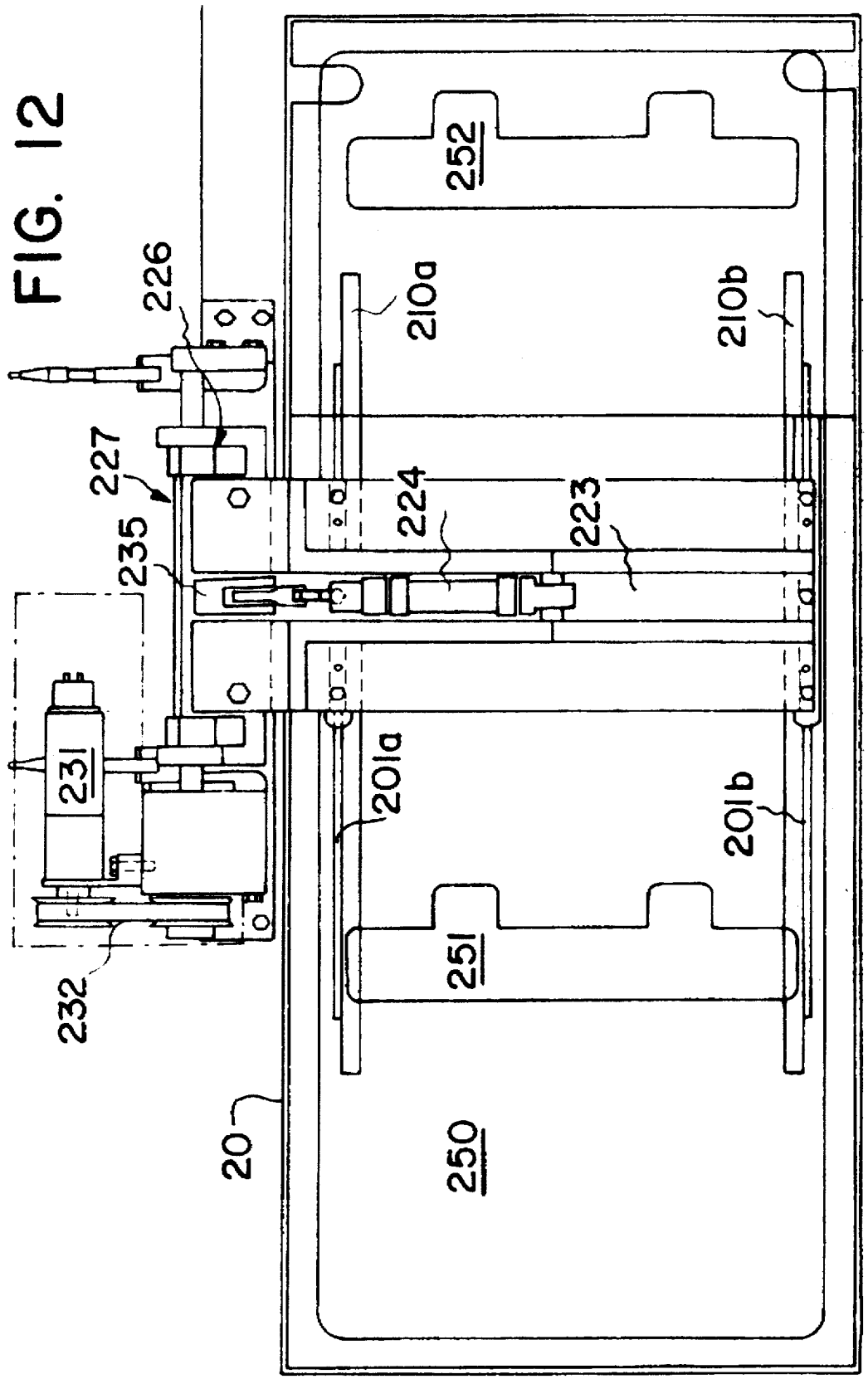
FIG. 12 is a top plan view of the hydration tank illustrated in FIG. 11 as viewed from section line F—F in FIG. 11.

As illustrated in FIG. 11, the hydration tank 20 provides for complete and full immersion of the first hydration carrier in a deionized water solution, wherein the solution contains a small amount of surfactant, typically on the order of 0.01% to 5% by volume. Suitable surfactants include the family of polymeric surfactants, in this instance, preferably a polyethylene oxide sorbitan mono-oleate, commercially sold under the trade name "Tween 80". This solution differs substantially from the hydration solution used in the prior art processes typified in U.S. Pat. No. 4,495,313 to Larsen inasmuch as the time consuming ionic neutralization of the polymer from which the lens blank may be made does not have to occur during the hydration process. When deionized water is used in the hydration process, a buffered saline solution is added to the final packaging of the lens so that final lens equilibrium (ionic neutralization, final hydration and final lens dimensioning) is accomplished in the package at room temperature or during the sterilization process. That neutralization creates temporary destabilization of the dimensions of the lens, and requires an extended period of time to complete, which results in a undesirably large batch operation when placed in an automated production line having a serial molding input and serial package output.

Figure 19:
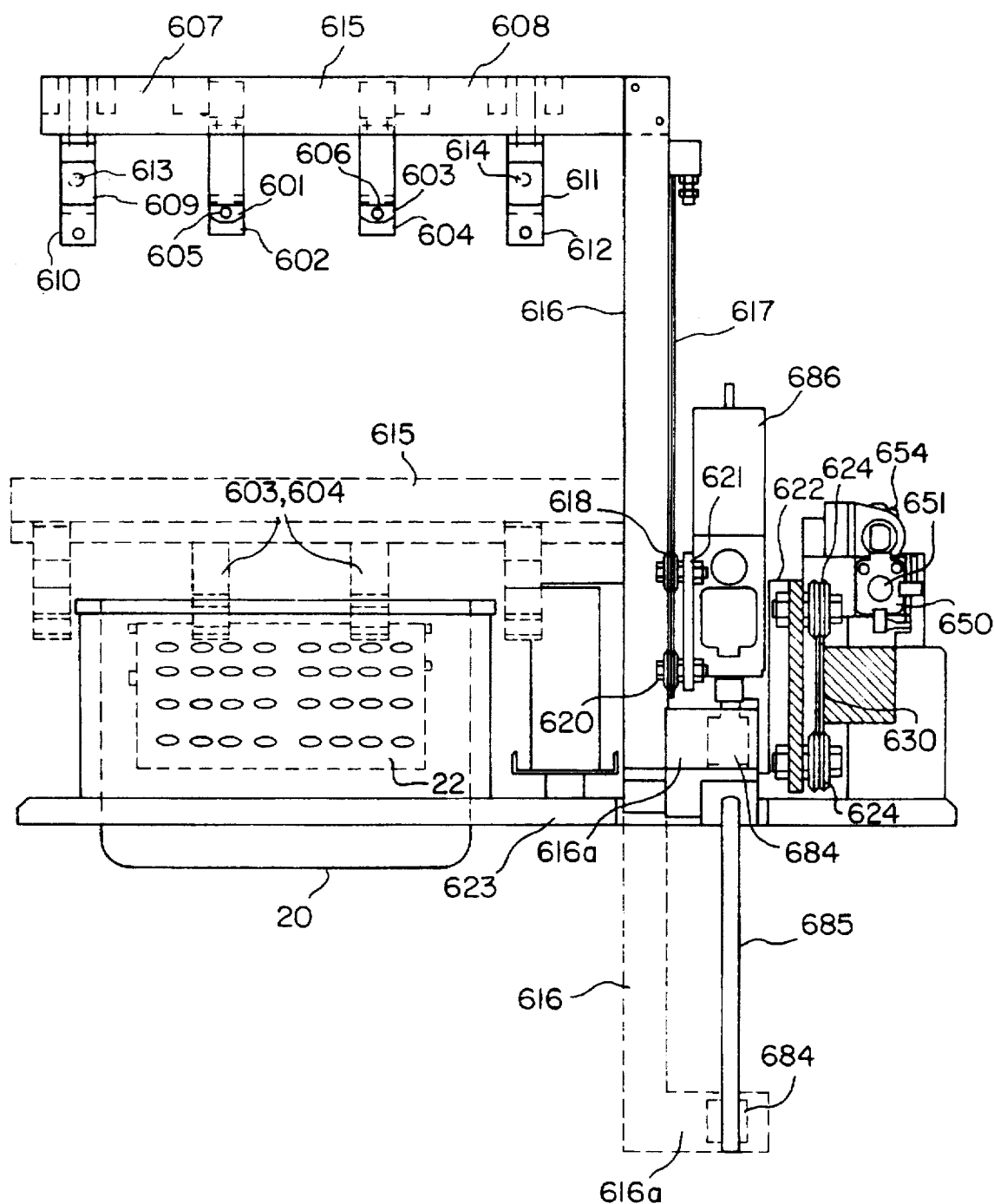
FIG. 19 is a partially cross-sectioned elevation and diagrammatic end view of the second robotic assembly illustrated in FIG. 18.

The first hydration carriers, with enclosed contact lenses, as illustrated in FIGS. 4 and 9, are inserted into hydration tank 20 by a first pick and place robotic unit 60 illustrated in FIGS. 18–19. The first pick and place unit 60 and the second pick and place unit 70 are substantially similar in their end view and a single end view, illustrated in FIG. 19, is provided for the description of both pick and place units 60 and 70. The relative motions of the two pick and place units 60,70 are somewhat different, and are diagrammatically illustrated in FIGS. 18(a) and 18(b). As illustrated in FIG. 18(a), the first pick and place unit 60 starts its cycle of operation at the pick point wherein it receives the first hydration carrier in a hand-off from the first robotic assembly, at the position illustrated in FIGS. 3 and 17(c).

Referring to FIG. 19, a first pair 601,602 and second pair 603,604 of gripping fingers engage the upper diagonal edge of the top chamber plate with a pair of registration pins 605,606 engaging the openings 15(c) in the top chamber plate as illustrated in FIG. 4. Registration pins 605,606 simultaneously maintain precise registration with respect to the positioning of the first hydration carrier, while ensuring that the first hydration chamber does not slip out of the gripping fingers during transit. Gripping fingers 601–604 are actuated by means of rotary shafts 607,608 which extend outwardly to a pair of actuating fingers 609,610 and 611,612. The actuating fingers 609–612 are opened and closed by pneumatic cylinders 613,614 mounted on the upper actuating fingers 609,611. Thus, as the cylinder 613 is actuated, the actuating fingers 609,610 open and close, rotating shaft 607, and thereby opening and closing the engaging fingers 601, 602. Likewise, engaging fingers 603,604 are actuated by pneumatic cylinder 614 through the motion of actuating fingers 611,612 and rotating shaft 608.

The gripping fingers and actuating fingers are carried on a first horizontal beam member 615 which is cantilevered out from a reciprocating frame member 616 and is secured to a reciprocating guide rail 617. Guide rail 617 is fixed for reciprocal movement between first and second pairs of guide rollers, two of which are illustrated in FIG. 19 at 618 and 620. The reciprocating frame member 616 and reciprocating guide 617 are fixed for reciprocation at a 45° angle by means of the bracket 621 which aligns the rollers 618–620 and supports them via a cross beam 622 to a set of reciprocating rollers 624. The entire reciprocal assembly, including fingers 601–604, cantilevered beam 615, reciprocating beam 616 and guide 617 thus reciprocate in both the Z axis of FIG. 19 (the X axis of FIG. 18) and along a diagonal axis, as best seen in FIG. 18. The reciprocating frame 616 also includes an L shaped lower member 616(a) which has mounted thereon a screw nut assembly 684 which may be driven up and down rotating screw 685 by means of drive motor 686. As drive motor 686 rotates in a clockwise direction, the screw rod 685 rotates thereby driving the screw nut 684 and reciprocating frame 616,616(a) upward (at a 45° angle as seen in FIG. 18). Counterclockwise rotation of motor 686 will drive the screw member 684 and the reciprocating frame 616,616(a) downwardly to the lower most portion of rotating screw rod 685, illustrated in dotted lines in FIG. 19.

Reciprocating frame 616 is held at an angled orientation by means of two pairs of guide rollers mounted on either side of reciprocating guide 617, two of which are illustrated as 618 and 620 in FIG. 19. Guide rollers 618,620 are secured to frame 621 and travel on a second reciprocal carrier 622 which will be hereinafter described with respect to FIG. 18.

FIG. 18(a) describes the relative motion of the gripping fingers 601–604 and the first hydration carrier, beginning with the pick point where the first hydration carrier is received from the first robotic assembly. After the first hydration carrier is secured by means of gripping fingers 601–604 and pins 605,606, the first pick and place unit 60 moves to the left in the direction of arrow A to provide clearance between the first hydration carrier and the first robotic assembly 40. After clearance is secured, the first hydration carrier is reciprocated upwardly in the direction of arrow C at a 45° angle until it has been lifted to a distance sufficient to clear the edge of hydration tank 20. After vertical clearance is secured, the pick and place unit 60 carries the first hydration carrier to the tank entry point in the direction indicated by the arrow B as carriage 622 traverses guide rail 630. When the pick and place unit 60 has reached the hydration tank entry point, motor 686 is actuated to lower support frame 615 downwardly in a direction indicated by arrow D until the first hydration carrier reaches the level of the hydration solution in tank 20. Upon reaching the solution level, motor 686 is slowed and the entry into the hydration tank continues at a rate not exceeding 40 mm per second. It has been found that if the rate of entry into the tank exceeds 40 mm per second, bubbles of air can be trapped in the hydration chamber formed between the first carrier element 17 and the contact lens mold 9 which may subsequently interfere with the transfer of the lens 8 from the mold 9 to the first convex lens carrier 17. Subsequent handling of the lens by the lens transfer means and convex carrier element 17 is via surface tension and gravity while immersed and air bubbles trapped between the lens and the convex carrier element 17 will impair the lens handling ability of the transfer means.

After reaching the end of its downward reciprocal travel, the first hydration carrier is placed in tank 20 as illustrated in FIG. 19, and released by the gripping fingers 601–604. The reciprocal frame 616 is then backed or withdrawn from the tank in the direction opposite to arrow D, and the pick and place unit 60 is reciprocated in a direction opposite arrow B to a home position. When the pick and place unit 60 has reached the home position, the drive motor 686 may be actuated to begin a second cycle of operation, wherein the pick and place unit 60, and horizontal frame member 615 begin a downward descent to the pick point or handoff point between the first robotic assembly and the pick and place unit 60.

Figure 13:
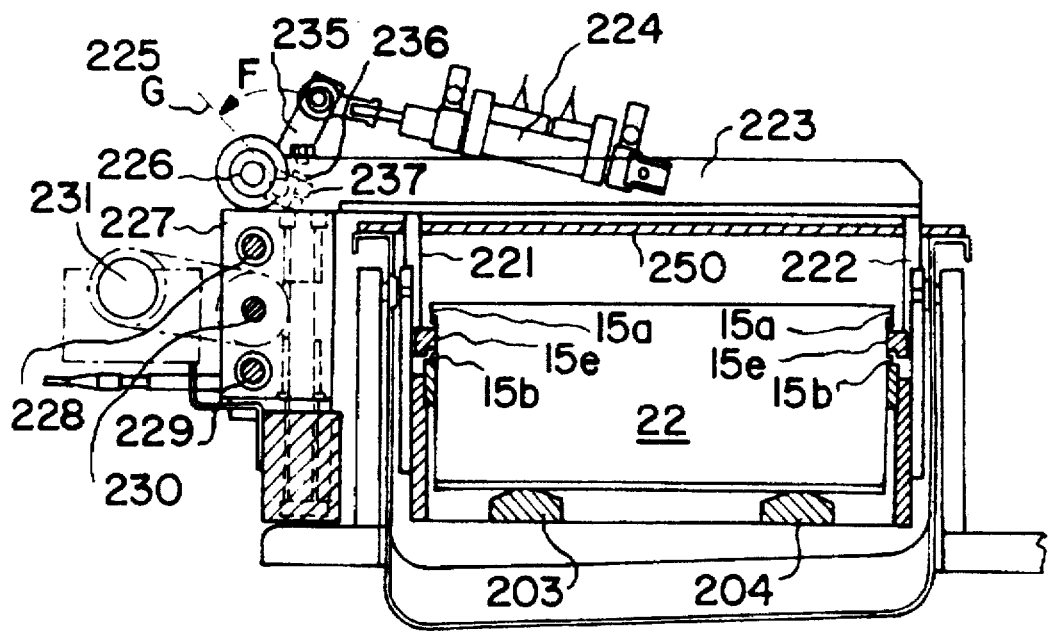
FIG. 13 is a cross-sectioned end view taken along section line A–A' of FIG. 11.

The first hydration carrier travels through the hydration tank 20 on two pairs of walking beams as will be hereinafter described with respect to FIGS. 11–14. As illustrated in FIG. 11, a first pair stationary walking beams is illustrated as a single beam 201 which is fixably mounted within the hydration tank with a series of notches 202 formed therein allowing its upper periphery for engaging the tabs 15(b) formed on the top carrier plate as illustrated in FIG. 4. The first hydration carrier 22 is also supported along edge 15(g) by a pair of lower support rails 203,204 as illustrated in FIG. 13. When the hydration carrier 22 is transported through the hydration tank 20, it is also supported by a pair of upper walking beams, one of which is illustrated at 210, which also has a plurality of notches 212 along their upper peripheries for engaging tab members 15(a) of the top chamber plate 15 and first hydration carrier 22. The upper walking beams 210 reciprocate vertically and horizontally with a first upward movement as illustrated by arrow A in FIG. 11 followed by a horizontal traverse as indicated by arrow B followed by a second vertical downward reciprocation indicated by arrow C, and a return stroke in the horizontal axis as indicated by the arrow D. The first hydration carrier is inserted into the tank before the upper walking beams 210 traverse their lower horizontal traverse, between arrow C and arrow A. This enables the upper walking beams 210 to enter space 15(e) between the upper and lower support tabs 15(a),15(b). When the upper walking beams 210 have reached their furthest travel in the X axis in the director of arrow D, it begins its upward travel in the direction of arrow A, wherein notches 212(a) engage the first hydration carrier and lift it from the insertion point where it was deposited by pick and place unit 60. As the first hydration carrier 22 is lifted upwardly by walking beams 210, the lower most tab 15(b) is lifted clear of the stationary walking beams 201. The upper walking beams 212 then traverse in the direction of arrow B carrying the first hydration carrier 22 with it for one horizontal step. Upper walking beams 212 are then lowered in the direction of arrow C thereby dropping the first hydration carrier 22 so that the lower most tab 15(b) will come to rest in the notches 202 of the stationary walking beam 201. While the first hydration carrier 22 is thus supported, the upper walking beams 210 continue their downward descent until completely free and are then reciprocates backwardly in the direction of arrow D to the initial start point. In this manner, the first hydration carrier 22 is advanced in a step by step manner to the opposite end of hydration tank 20.

Figure 14:
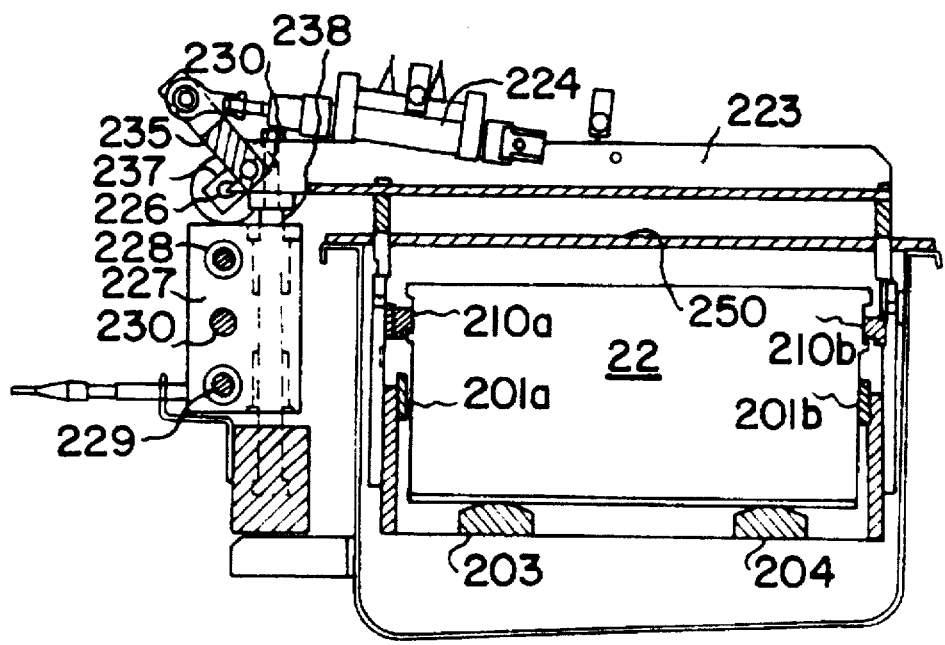
FIG. 14 is a sectional view taken along section line B–B' of FIG. 11.

The reciprocal movement of the upper walking beams 212 is provided by means of two traveling yokes 221,222 which are suspended from a traveling support beam 223. Support beam 223 is mounted for vertical reciprocal movement on guide tubes 238 as illustrated in FIG. 14. The support beam 223 is lifted in the vertical dimension by means of drive cylinder 224 and a rotating over center mechanism 225 which is journaled for rotation about pivot axis 236. The over center mechanism 226 is supported by a movable carriage 227 which travels along guide tubes 228,229 by means of a rotating screw mechanism 230. Rotating screw 230 is driven by a reversible motor and a reduction transmission 231 through belt drive 232. As drive motor 231 is rotated in a first direction, the drive screw 230 advances carriage 227 in the direction of arrow B of FIG. 11, thereby moving carriage 227, support shaft 226, the over center mechanism 225, the drive cylinder 224, and the cross beam 223 which supports the upper walking beams 210 and each of the hydration carriers 22 resting thereon.

The horizontal beam 223 is also fixed for vertical reciprocation on guide tubes 238 which are fixably attached to the traveling carriage 227. Guide tubes 238 thereby restrain horizontal motion in the X axis of FIGS. 13 and 14 and translate all of the pivotable motion of the over center mechanism 225 into a vertical lifting moment.

The over center mechanism 225 which lifts support beam 223 and the upper walking beam 210 is driven by drive cylinder 224 to rotate a first link 235 about pivot axis 236. About pivot axis 236, are fixed two bell cranks 237, on to which are mounted two shafts with rollers 226. Link 235 then reciprocates for a first moment along the axis of the arrow F as illustrated in FIG. 13 until roller 226 reaches carriage 227 as indicated by stop point axis G in FIG. 13. Drive cylinder 224 continues to expand, thereby causing rotation of crank 237, which results in an upward movement of crank arms 237 and pivot axis 236, thereby lifting the entire assembly as illustrated in FIG. 14. While the assembly is thus lifted, drive motor 231 is then actuated to advance traveling carriage 227 along guides 228,229 by means of the rotating screw 230. When the upper walking beam has reached the end of its transit in the horizontal axis, then drive cylinder 224 is relaxed, thereby allowing the short crank arms 237, link 235 and the cross beam 223 to return to their original position, and the walking beam 210 to reach its lower most limit of travel.

The transit time in hydration tank 20 is to some extent dependent upon the temperature of the hydration bath. For a deionized water hydration bath with a 0.05% surfactant, the desired residence time for a HEMA soft contact lens varies from 3 to 10 minutes at temperatures of 55° C. to 90° C. In the preferred embodiment, a 5 minute residence time has been found advantageous when the hydration bath temperature is maintained at 70° C. ±5°. At the end of the 5 minute period, the first hydration carrier 22 has traveled the length of hydration tank to the lift tank exit point indicated as 22(b) in FIG. 11. The hydration tank 20 may be covered with an insulating cover 250 having a pair of opening slots 251,252 which provide entrance and egress for the first hydration carriers 22, as carried by pick and place units 60,70 respectively.

It is noted that during the transit in the hydration tank, the contact lens 8 hydrates and swells, thereby breaking free of the front curve mold half 9. Since the top chamber plate 15 and the front curve mold halves have been inverted by the first robotic assembly 40, prior to placement in the tank, the lens is subjected to gravity as soon as it breaks free of mold half 9.

While subsequent agitation of the first hydration carrier may move the lens about in the defined hydration chamber, the lens will settle on the convex lens transfer surface 17 as the first hydration carrier is lifted free of the hydration bath by pick and place robotic unit 70.

Figure 21:
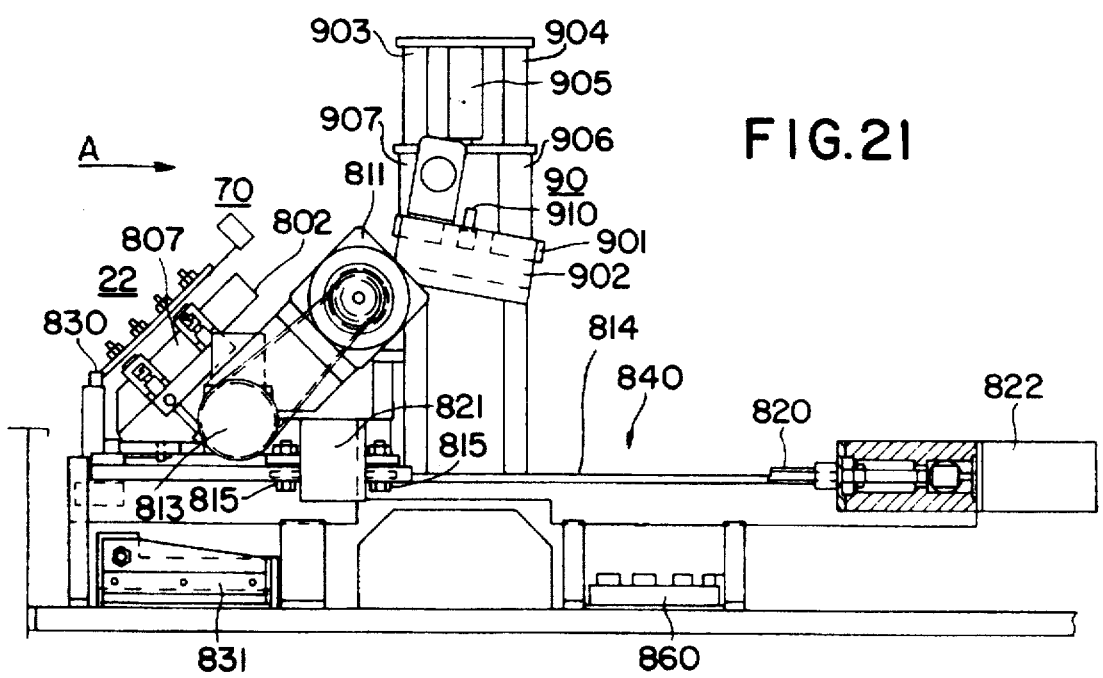
FIG. 21 is an elevation side view of the third robotic assembly illustrated in FIG. 20.

The second pick and place unit 70 withdraws the first hydration carrier 22 from the hydration tank 20 by descending downwardly at a 45° angle as illustrated in FIG. 18(b) to reach the pick point. In doing so, the gripping fingers 601–604 traverse through opening 252 in the tank cover and engage the openings 15(c) in the top chamber plate 15 with pins 605,606. The fingers are then clamped together by means of pneumatic cylinders 613,614, and a rotary motor similar to 686 is actuated to drive the second pick and place unit 70 upwardly along threaded rod 685(b) along the diagonal axis illustrated in FIG. 18(b). While the hydration carrier is immersed in the hydration tank, the upward movement is limited to 24 cm/sec. After the first hydration carrier 22 has cleared the hydration bath, the upward movement is accelerated, until it reaches the vertical limit of travel as indicated in FIGS. 18 and 19. Pick and place unit 70 is then reciprocated in the travel direction indicated in FIG. 18(b) until it reaches the hand-off point for the third robotic assembly, and begins a short downward stroke to place the first hydration carrier 22 on a fixed reference bar 830 as illustrated in FIG. 21. After reaching the reference bar, the gripping fingers 601–604 are opened, and the pins 605,606 withdrawn, to allow the hydration carrier to rest at a fixed reference point for hand-off to the third robotic assembly as will be hereinafter discussed in detail. After hand-off, the second pick and place unit 70 is then reciprocated back upwardly to its upward moment of travel by rotation of the screw thread 685(b) and the entire assembly is then reciprocated back along the return path to its initial starting point. At the initial starting point, the second pick and place unit 70 may begin its downward descent into the hydration tank 20 to pick up another first hydration carrier.

The movements of pick and place unit 60, walking beams 210,212 and the pick and place unit 70 are coordinated by a PLC control means 155 to ensure an orderly sequence of hydration for first hydration carriers 22 as they are placed into and lifted out of the hydration tank.

The pick and place units 60 and 70 are mounted for reciprocal travel in the horizontal axis of FIG. 18 on a fixed track 630 by means of carriages 622 and 642. Carriage 622 is supported by four grooved rollers 624 while carriage 642 is supported by four grooved rollers 644. The carriage member 642 is reciprocated in the horizontal axis by means of pneumatic drive cylinder 645 and piston rod 646 which is fixably attached to carriage 642 by means of bracket 647. The first pick and place unit 60 is carried by carriage 622 along the horizontal axis and is reciprocated by means of pneumatic cylinder 650 and piston rod 651, from reference point 652 to reference point 653, as indicated by the dotted lines in FIG. 18.

A second short stroke hydraulic cylinder 654 is connected between the carriage member 624 and piston rod 651 and provides the short clearance bump of the pick and place unit 60 away from the first robotic assembly 40 prior to insertion.

THIRD ROBOTIC ASSEMBLY

The third robotic assembly of the present invention receives the first hydration carrier from the second robotic assembly, removes the lens molds, flushes the contact lenses that are now retained by the convex lens carrier elements of the top chamber, plate and then matches the top chamber plate with a hydration base to form a second hydration carrier. The movements of the third robotic assembly are complex, and summarized in FIG. 23. The third robotic assembly itself is summarized in FIGS. 20–22, the hydration base with which it interacts is summarized in FIGS. 6, 7 and 10 and the stations with which it interacts are depicted in FIGS. 24–31.

As noted previously, each of the lenses have been transferred by gravity, through the hydration solution, and are now supported on the convex lens engagement surfaces 17 of each of the carrier elements 16.

Figure 23:
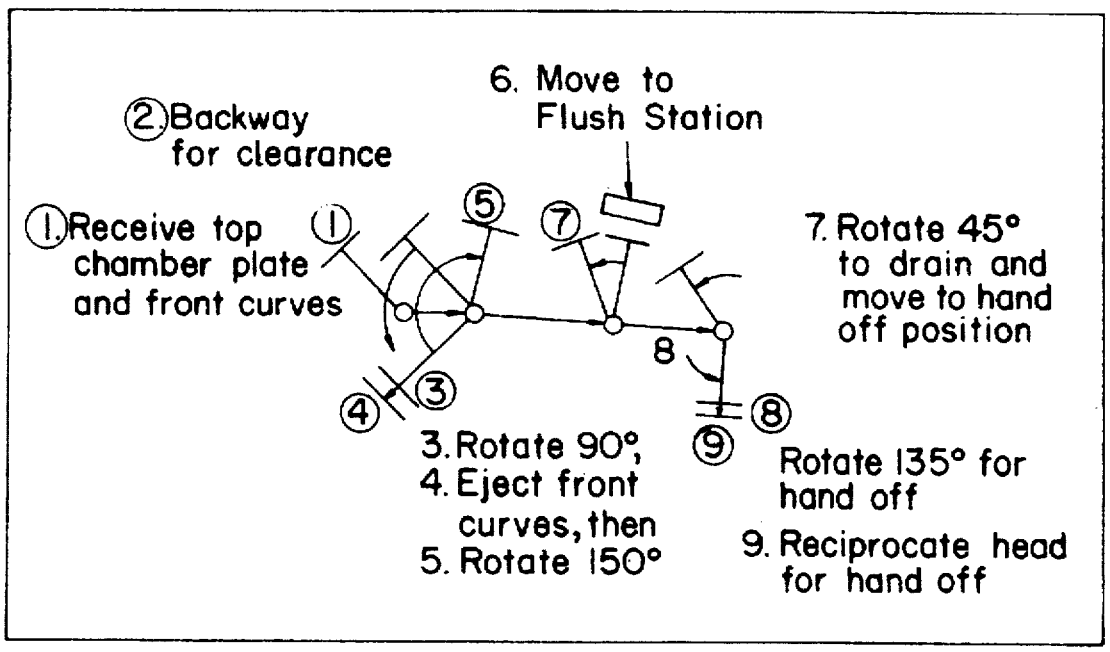
FIG. 23 is a diagrammatic illustration of the movement of the third robotic assembly illustrated in FIGS. 20–22.

The operation of the third robotic assembly will be summarized with respect to FIG. 23 wherein the third robotic assembly receives a top chamber plate, contact lenses and front curves at step 1 after the second pick and place unit 70 has deposited the top chamber plate, lenses and front curve mold halves (the first hydration assembly) on a reference bar 830 for registration purposes. A reciprocal gripping head with a plurality of vacuum grippers is reciprocated into engagement with the first hydration carrier and the third robotic assembly then backs away from the reference bar and the second pick and place unit for clearance purposes. After clearance is achieved, the first hydration assembly is rotated approximately 90° counterclockwise and the reciprocating head is actuated to draw the front curve mold halves into engagement with fixed ejector rods mounted on the third robotic assembly. This causes the front curve mold halves to be ejected and removed from the top chamber plate leaving the contact lenses carried on the convex surface of the lens carrier 16 via surface tension. After ejection of the front curve mold halves, the rotating assembly of the third robotic assembly is rotated approximately 150°, or approximately 15° over center to the position schematically illustrated at position 5 in FIG. 23. The carrier is then reciprocated along the horizontal axis to a flushing station and paused, wherein the flushing station reciprocates downwardly to the top chamber plate while the contact lenses remain secured to the convex surface of the lens carrier means via surface tension. The lenses are flushed, partially to cool the lenses from the temperature of the hydration bath, partially to flush away any residual aqueous solution remaining on the lenses from the hydration bath and partially to ensure adequate hydration of the lens while in an atmospheric environment. The flush station is then reciprocated upwardly, and the third robotic assembly then rotates approximately 45° to drain the top chamber plate and lenses of any remaining flushing solution from the flushing station. After a suitable drain period, the rotating assembly is then reciprocated along the X axis to the final handoff position, illustrated at step 8 in FIG. 23, where it is rotated approximately 165° to a vertical position, and a reciprocating head is then reciprocated downwardly from step 8 to step 9 of FIG. 23 to engage the top chamber plate with a hydration base, and thereby form the second hydration carrier of the present invention. Following the hand-off of the top chamber plate, the rotating assembly is rotated back 135° to approximately 45° off vertical, and the entire assembly is then reciprocated along the X axis back to the assembly start point where it is indexed to receive another first hydration assembly.

Figure 22:
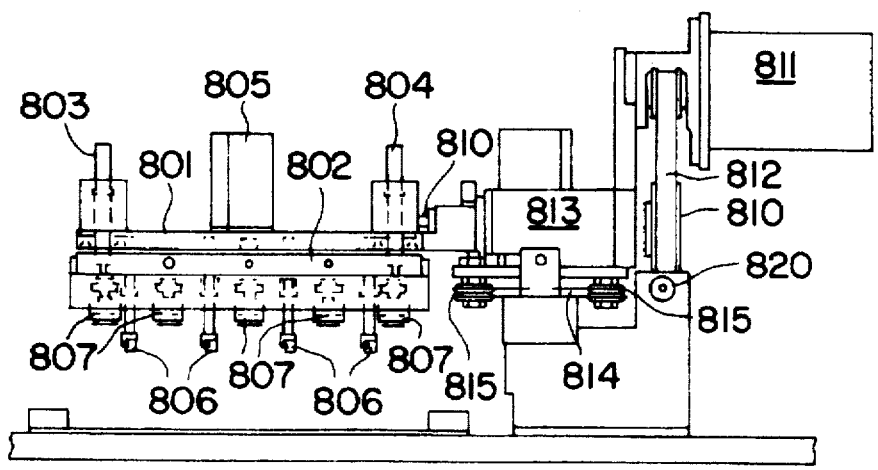
FIG. 22 is an elevational end view of the third robotic assembly illustrated in FIGS. 20 and 21.

As illustrated in FIG. 22, the rotating assembly includes a first rotating platform 801 and a reciprocating rotating platform 802, which is reciprocated with respect to the first rotating platform 801 along guide tubes 803,804 via pneumatic drive cylinder 805. Secured to the first rotating platform 801 are eight ejector rods 806, four of which are visible in FIG. 22. Mounted to the reciprocating rotating plate 802 are eight vacuum grippers 807 which are adapted to engage and grip the back or smooth side 15(d) of the top chamber plate 15 illustrated in FIG. 4. The first rotating platform 801 is mounted for rotation about shaft 810, and is rotated by means of motor 811 and drive belt 812. Shaft 810 is journaled for rotation within housing 813 which also serves as a reciprocal carriage for the rotating portion of the third robotic assembly.

Figure 20:
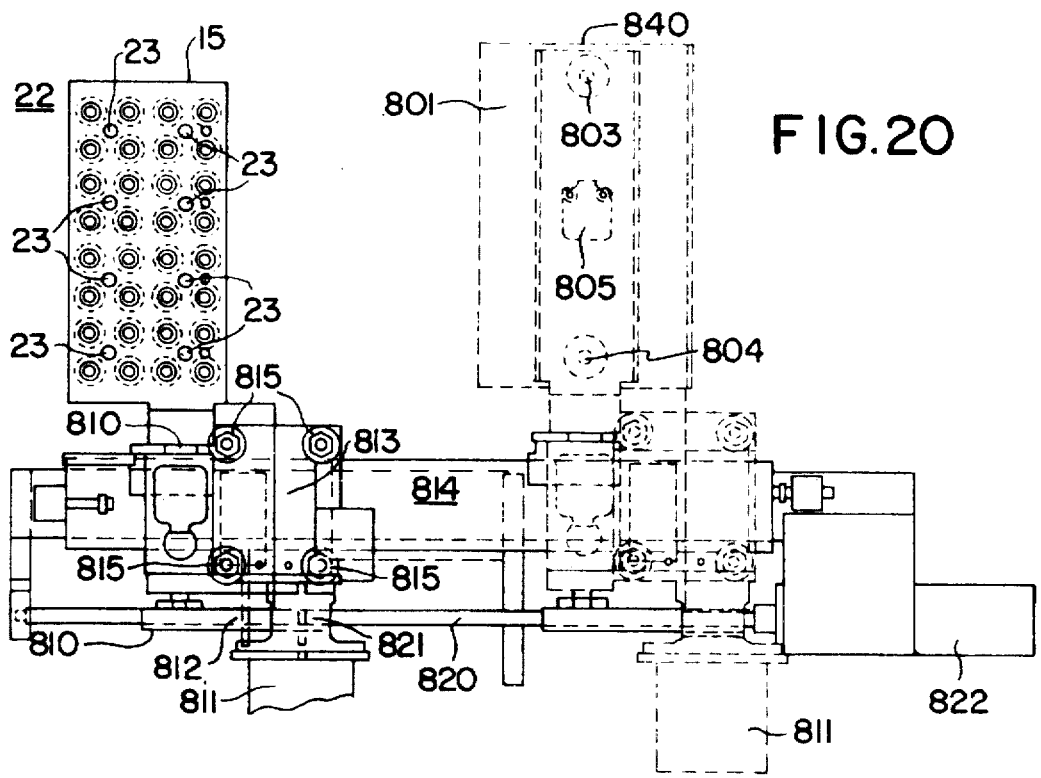
FIG. 20 is a top plan view of a third robotic assembly used in the present invention.

Carriage member 813 is mounted for reciprocal travel on a horizontal rail 814 by means of four slotted rollers 815, two of which are visible in FIGS. 21 and 22, and four of which are visible in FIG. 20. Carriage 813 reciprocates along track 814 from a pick position, illustrated in solid lines in FIG. 20 to a hand-off position, illustrated in dotted lines in FIG. 20. The carriage 813 and rotating assembly are reciprocally driven by means of a screw thread 820 which engages a screw follower 821 mounted on carriage 813. Screw thread 820 is rotated by means of drive motor 822 to draw the rotatable carriage to the hand-off position when rotating in a clockwise direction, and to return the rotating carriage to the pick position when rotating in the counterclockwise direction.

As illustrated in FIG. 21, the rotatable reciprocating platform 802 having vacuum grippers 807 mounted thereon has been positioned substantially adjacent a first hydration assembly 22 that is resting on a registration bar 830 and supported by fingers 602,604 of pick and place unit 70. The reciprocal rotatable platform 802 is advanced into contact with the first hydration assembly to ensure that each of the extraction rods 806 is in alignment with one of the apertures 23 formed in the top chamber plate 15 of the first hydration carrier. Two of the apertures 23 formed in the top chamber plate 15 may be used for registration purposes, by fitting the reciprocating platform 802 with tapered pins for engaging apertures 23. After the first hydration carrier 22 has been secured to the vacuum gripping means 807, the second pick and place unit 70 reciprocates upwardly out of the way, and then back to its home position as previously described. The rotating assembly is then moved along the horizontal X axis in the direction of the arrow A for a short distance to clear registration bar 830.

Once clearance is achieved, rotating assembly 813 is rotated approximately 90° in a counterclockwise direction to place the front curve mold halves over the collection tray 831. The reciprocating and rotating platform 802 is then reciprocated to the position illustrated in FIG. 22, which drives the extraction rods 806 through the openings 23 into the top chamber plate, to thereby engage a plurality of triangular tabs formed on one of the front curve mold halves, as illustrated by tab 9(b) in FIG. 8. The front curve mold halves 9 are thereby freed from the clips 18(a),18(b) which secured the front curve mold half to the top chamber plate 15. During the rotation of the rotating assembly 813, and the movement of the rotating and reciprocating plate 802, a contact lens is retained on the convex lens holding surface 17 by virtue of surface tension. After the front curve mold halves 9 have been ejected into the collection tray 831, the reciprocating and rotating platform 802 and the top chamber plate 15 are rotated clockwise approximately 150°, and the movable carriage 813 is then reciprocated to a second position in the direction of arrow A in FIG. 21, to bring the top chamber plate, and the contact lenses secured thereto, into alignment with the flushing station 90 illustrated in FIG. 21.

Flushing station 90 includes a reciprocal flushing head 901, and a flushing manifold 902, which reciprocate on a pair of guide tubes 903,904 by means of a pneumatic cylinder 905. The flushing head 901 is fixably secured to a pair of reciprocal collars 906,907 which reciprocate along guide tubes 903,904. The source of flushing fluid, preferably deionized water, is supplied to conduit 910 for flushing the exterior concave surface of the contact lens secured to the lens carrier surface 17 of the top chamber plate 15. As will be hereinafter explained with respect to the flushing station and the manifold of FIGS. 28–31, a separate stream of flushing fluid is provided for each contact lens to cool the lens from the approximate 70° C. temperature of the hydration bath, and to remove any residual aqueous solution remaining on the lens from the hydration bath. This flushing step is also desirable to maintain complete hydration of the lens prior to the transfer of the lens to the second hydration carrier. After a short flushing cycle of 0.5 to 5 seconds, the flushing station 901 and flushing manifold 902 is reciprocated upwardly, and the rotatable carrier is then rotated approximately 30° in a counterclockwise direction to drain the top chamber plate and lenses of flushing fluid. The reciprocal carriage 813 is then advanced again in the X axis in the direction of arrow A to center line 840 of the hand-off position. Upon arrival at the hand-off position, the rotatable carriage 813 and the rotatable and reciprocal plate member 802 are rotated in a counterclockwise direction approximately 165° to position the top chamber plate, and the contact lenses adhered thereto, directly above the hydration base member 860 which has been positioned therebelow by indexing mechanism 100. The reciprocal rotatable carriage 802 is then reciprocated downwardly to engage the top chamber plate 15 with the hydration base member 860 to form the second hydration carrier and the hydration chamber as illustrated in FIG. 10. FIG. 10 illustrates a single lens transfer means, and a single concave lens holding means in partial cross-section. After the transfer of the top chamber plate to the hydration base member 860, the vacuum cups 807 are released, and the reciprocal rotatable platform 802 is raised to the position illustrated in FIG. 22, wherein the rotating assembly is rotated back approximately 135° in a clockwise direction and the carriage 821 is returned along the horizontal axis in a direction opposite to arrow A to place the third robotic assembly at the initial home position.

The hydration base member 860 is more fully described and illustrated with respect to FIGS. 6, 7 and 10 which illustrates a multilevel carrier having a plurality of concave lens holding means 861 mounted thereon. Each of the concave lens holding means 861 includes a central fluid port 862 for introducing a fluid between the concave lens holding means and a contact lens contained therein. As will be hereinafter described, this fluid may be air or water. Each of the fluid ports 862 is connected via a plurality of fluid passageways which extend through each layer of the manifold to four upwardly extending fluid coupling members 863, one of which is illustrated in cross-section in FIG. 6. Fluid introduced through these fluid coupling ports 863 travels through the coupling to four V-shaped conduits 864 defined in plate layer 865 to feed a series of crossover manifolds 866. Crossover manifolds 866 are defined in manifold layer 867 and feed directly to the fluid ports 862 defined in each of the concave lens holding means 861. In between each row of concave lens holding means 861 is a drain trough 870 which extends outwardly to an outer collection channel 871 which extends around the periphery of the hydration base to drain liquid flowing from the hydration chambers to be defined by the concave lens holding means 861 into a sump 872 for collection as will be hereinafter later described.

The hydration base illustrated in FIGS. 6 and 7 is combined with the top chamber plate 15 to form the second hydration carrier 23, having a plurality of hydration chambers therein. In the embodiment illustrated with the top chamber plate of 4 and 5 and the hydration base of FIGS. 6 and 7, thirty-two separate hydration chambers are formed between the convex lens transfer surface 17 and each of the concave lens holding means 861. When the top chamber plate 15 is lowered into engagement with the hydration base 860, the clips 18(a), 18(b) spring outwardly to engage the outer wall 861(a) of the concave lens holding means. The outer circumferential wall 19 of the carrier element 16 is received within a stepped recess 861(b) defined by the concave lens holding means 861. A plurality of openings 21 formed in the circumferential wall 19 provide a plurality of fluid discharge openings for fluid introduced through fluid port 862 for the concave lens holding means, and port 22 of the convex lens holding means 17. Thus, fluid may be introduced into the hydration chamber from either side of contact lens during flushing of the hydration chamber, and will remain in the concave lens holding means 861 after flushing by virtue of a fluid equilibrium which is established at the upper periphery 861(c) of the concave lens holding means. This residual fluid is used for extraction.

Figure 27:
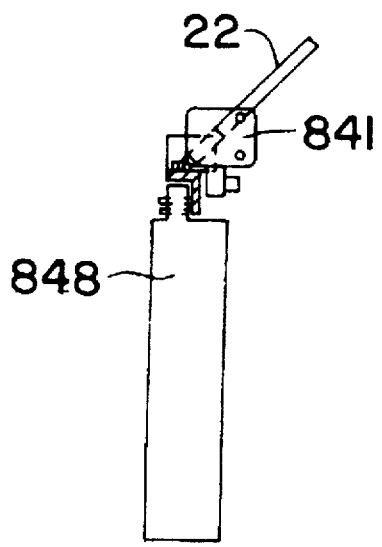
FIG. 27 is a side elevation view of the indexing or alignment guide illustrated in FIG. 26.
Figure 29B:
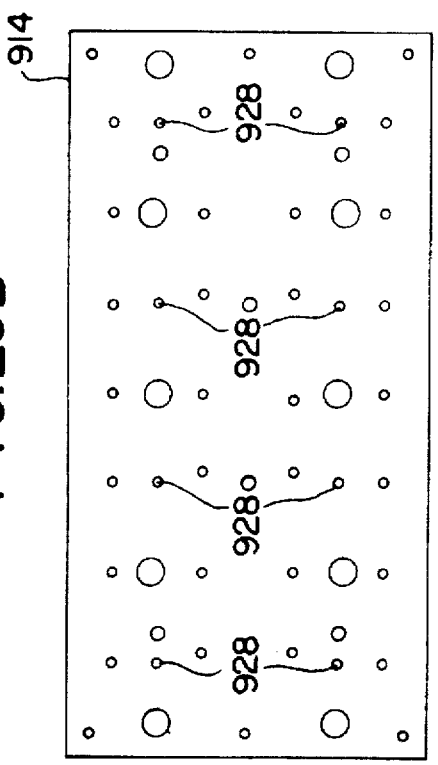
FIG. 29(b) is a diagrammatic plan view of level 2 of the manifold illustrated in FIG. 28.
Figure 29D:
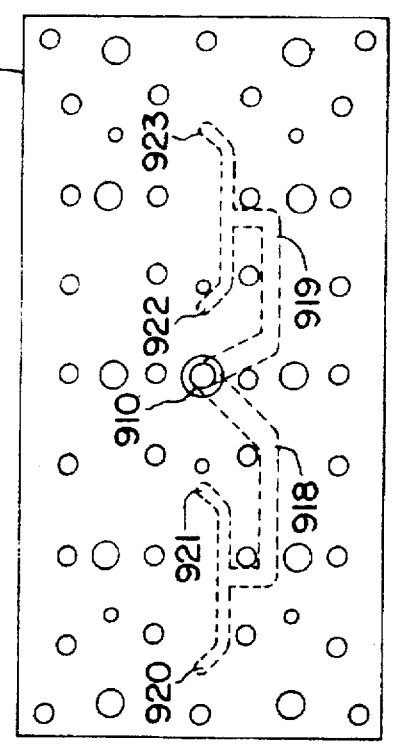
FIG. 29(d) is a diagrammatic plan view of level 4 of the manifold illustrated in FIG. 28.
Figure 29A:
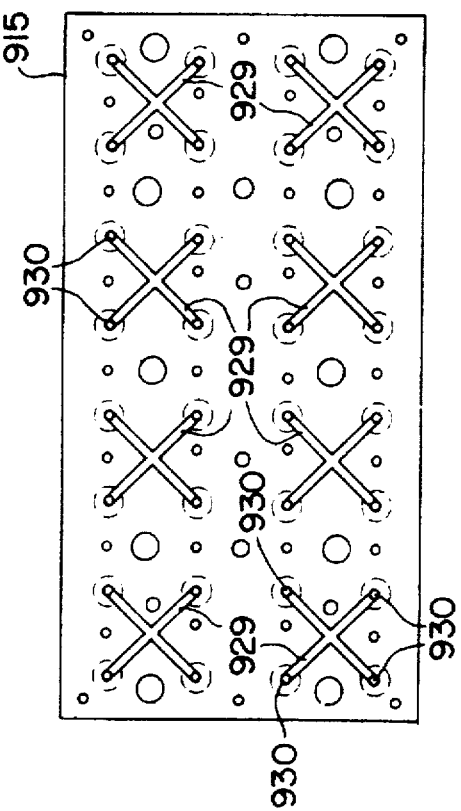
FIG. 29(a) is a diagrammatic planar view of level 1 of the manifold illustrated in FIG. 28.
Figure 29C:
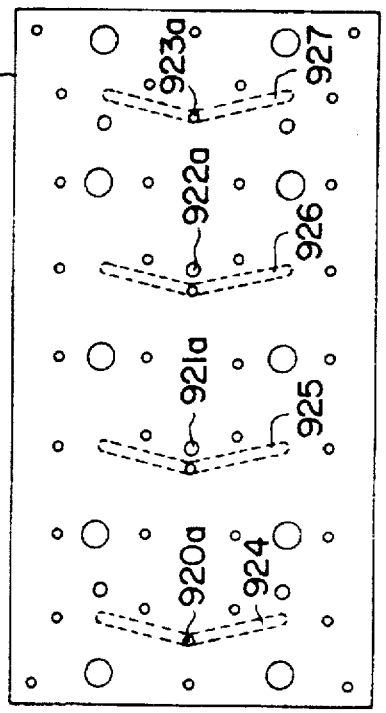
FIG. 29(c) is a diagrammatic plan view of level 3 of the manifold illustrated in FIG. 28.

The registration bar for the hand-off between the pick and place unit 70 and the third robotic assembly is further illustrated in FIGS. 26 and 27 wherein registration bar 830 has mounted thereon an adjustably fixed stop member 840 which provides a fixed reference point along the X axis of FIG. 26. On the opposite end of reference bar 830, is a pneumatic cylinder 841 having a piston member 842 which is actuated after the first hydration chamber 22 has been placed on the reference bar 830 as illustrated in FIG. 27. After placement, pneumatic cylinder 841 is actuated, thereby urging piston 842 into engagement with the first hydration carrier 22 and moving it against the fixed reference stop 840. The reference bar 830 is secured to the hydration station of the present invention by means of vertical supports 842,843. The upper portion of the hydration carrier is held in position by the fingers of the second pick and place unit 70. In this manner, the first hydration carrier 22 is precisely positioned and registered for hand-off to the third robotic assembly to ensure that the extraction rods 806 will be in alignment with the openings 23 defined in the top chamber plate 15 of the first hydration carrier 22.

Figure 25:
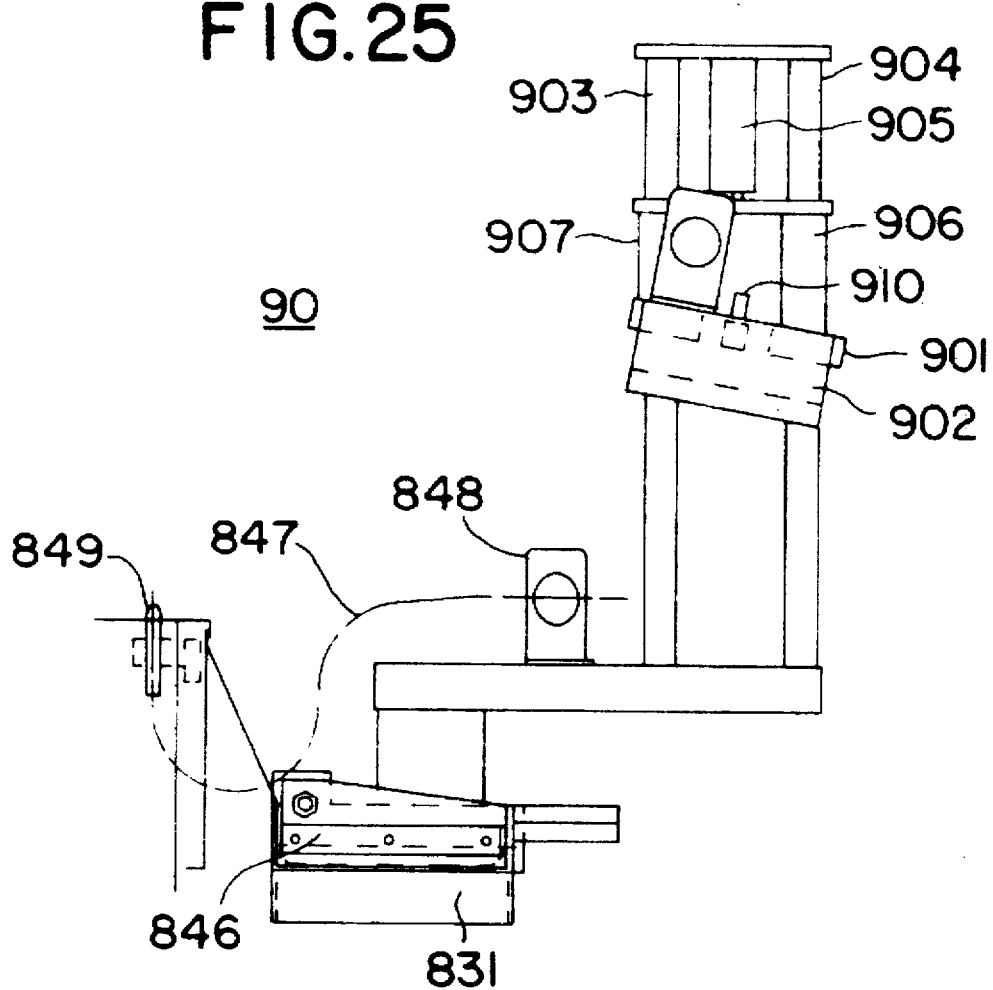
FIG. 25 is a side elevation view of the lens flushing station illustrated in FIG. 24.

The flushing station 90 of the present invention is further illustrated in FIGS. 24 and 25 wherein the reciprocal flushing head 901 is mounted on collars 906,907 for reciprocation along vertical guide tubes 903,904 by virtue of pneumatic cylinder 905. The vertical guide tubes 903,904 are mounted on a stationary frame member 915 secured to the hydration apparatus. A flushing liquid is supplied by a conduit 916 to port 910 and the flow of fluid therethrough is sequenced by a solenoid operated pinch valve 917 in response to the control system 155 for the hydration apparatus. A catch basin 831 is provided for receiving the discarded front curve lens molds after ejection by ejector rods 806. A pneumatic drive cylinder 845 is used to drive a sweep mechanism 846 across the catch basin 831 to thereby move the discarded front curve lens molds into opening 846 where they are removed for regrinding and recycling. A water makeup line 847 may also be provided with a pinch valve 848 to supply makeup deionized water to the hydration tank through conduit 849. A positive displacement pump also meters a small amount of surfactant into the hydration tank with each water makeup, in order to maintain the surfactant concentration at 125 to 500 ppm with respect to the deionized water.

The flushing manifold 902 is more particularly illustrated and described in FIGS. 28–31 in which FIG. 28 represents a partially cross-sectioned elevation view of the flushing manifold, FIGS. 29(a)–29(d) represent each of the various levels of the manifold and FIG. 30 represents diagrammatically the overall arrangement of the manifold passageways. FIG. 31 is a cross-sectioned elevation view of manifold level 1, and FIG. 31(a) is an enlarged cross-section of a portion of FIG. 31.

As illustrated in FIGS. 28 and 29(a)–(d), manifold 902 is formed from four discreet layers or levels 912, 913, 914 and 915. The manifold is secured together by a plurality of screws, one of which is illustrated at 916, which extend through a plurality of commonly aligned openings 917 for a threaded engagement with level 1 manifold 915. As illustrated in FIGS. 29 and 30, thirty-seven such screw fasteners are used, two rows of which have been referenced with reference numeral 917. As illustrated in FIG. 30, flushing fluid enters from fluid line 916 into the fluid port 910 and is distributed by channels 918,919 that are milled or cast into the under surface of the top level 912 to be distributed to four distribution points 920–923. From distribution points 920–923, the fluid travels through plate 913 or manifold level 3 by virtue of holes drilled in plate 913 at 920(a)–923(a) to a second set of milled or cast channels 924–927 which provide distribution to eight vertical bores 928 drilled through plate 914 or manifold level 2. The fluid then flows to eight cross manifolds 929 that are milled or cast on the upper surface of plate 915 to thirty-two vertical bores 930 which terminate in nozzles 931 as illustrated in FIGS. 31 and 31(a).

While the exact configuration of vertical bores and milled channels may vary from manifold to manifold, the principles of construction for each of the manifolds used in the flushing station, the extraction station, and the separation station are substantially the same as set forth in FIGS. 29(a)–(d). The purpose of this configuration is to ensure a very precise even distribution of flow from one supply line to a plurality of receiving points.

In particular, the extraction station manifold illustrated in FIGS. 34–36 utilizes a similar method of construction with one additional layer of functionality. The extraction manifold in FIGS. 34–36 includes two distinct sets of fluid passageways, one to feed a plurality of discharge nozzles as illustrated in FIG. 35(a), and a second to feed a series of pass through nipples which supply a flushing flow to the hydration base as will be hereinafter described. As illustrated in FIG. 34, a central port 935 receives a flow of deionized water and diverts it into two primary manifolds 936,937. Manifold 937 is milled in the under side of plate 938 and channels the fluid flow to four distribution points 939 where the fluid passes downwardly through vertical bores in plate 940 to be distributed along channels 940(a) formed in the lower or under surface of plate 940. Each of these channels terminate in a vertical distribution port 941 which is drilled into plate 942. The output of the flow through bore 941 is then diverted by means of cross channel manifolds 943 that are milled or cast into the upper surface of plate 944. Plate 944 has formed thereon two separate types of discharge orifices. In the embodiments as illustrated in FIGS. 34–36, thirty-two separate discharge nozzles 945 provide a flow of deionized water to each of the hydration chambers formed in the second hydration means through the openings 26 formed in the top chamber plate 15. Simultaneously, a second flow of fluid flows through distribution manifold 936 to four vertical discharge ports 946 and passes through each of the manifold plates 940–944 to terminate in a hydration base nozzle 947 as illustrated in FIG. 35(a). Each of these discharge nozzles engages the upstanding fluid couplings 863 which extend upwardly from the hydration base through the openings 24 defined in a top chamber plate to enable fluid to be supplied directly to ports 862 formed in each of the concave lens holding means 861.

Figure 32:
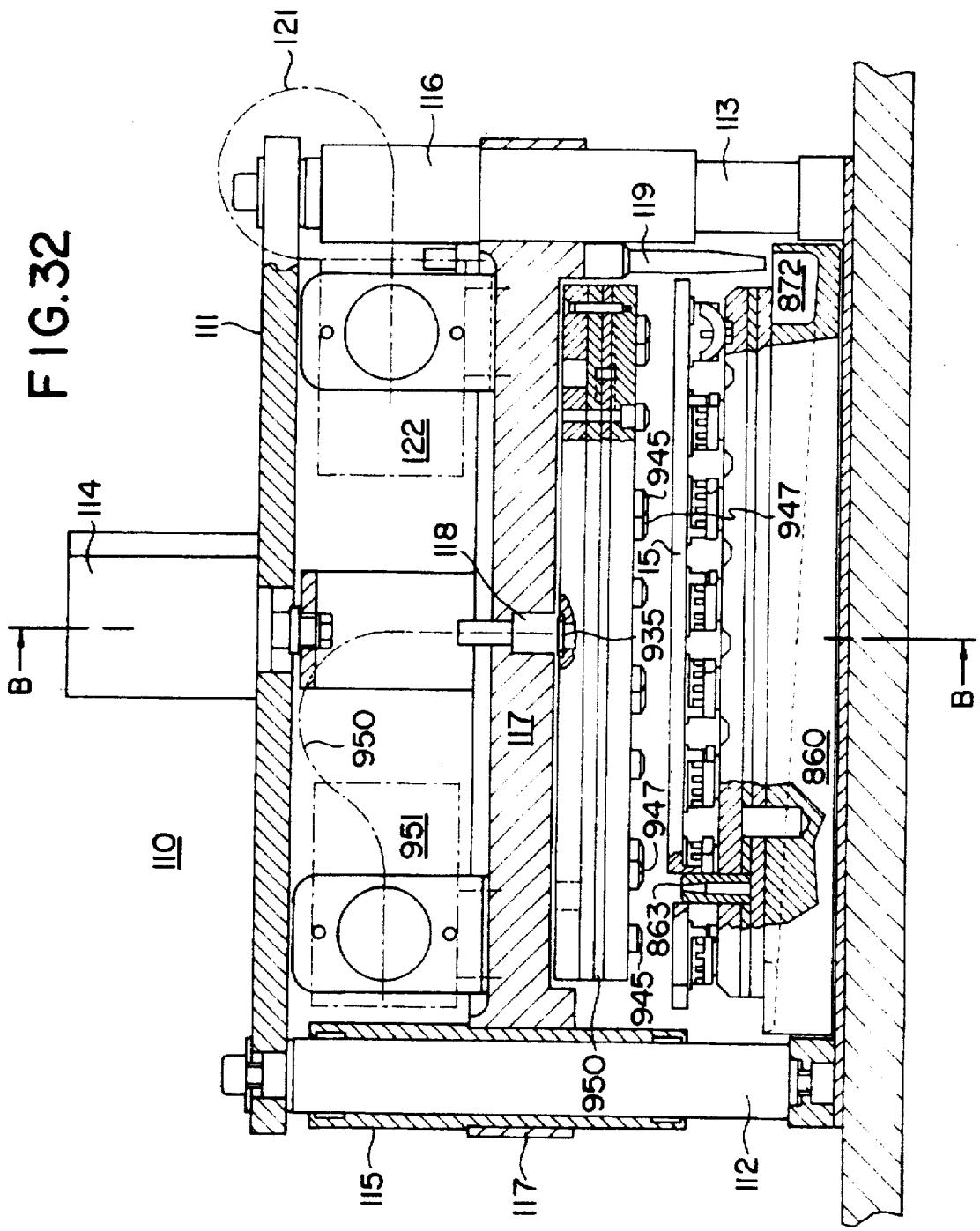
FIG. 32 is a partially cross-sectioned elevation end view of a hydration extraction station utilized in the present invention.
Figure 33:
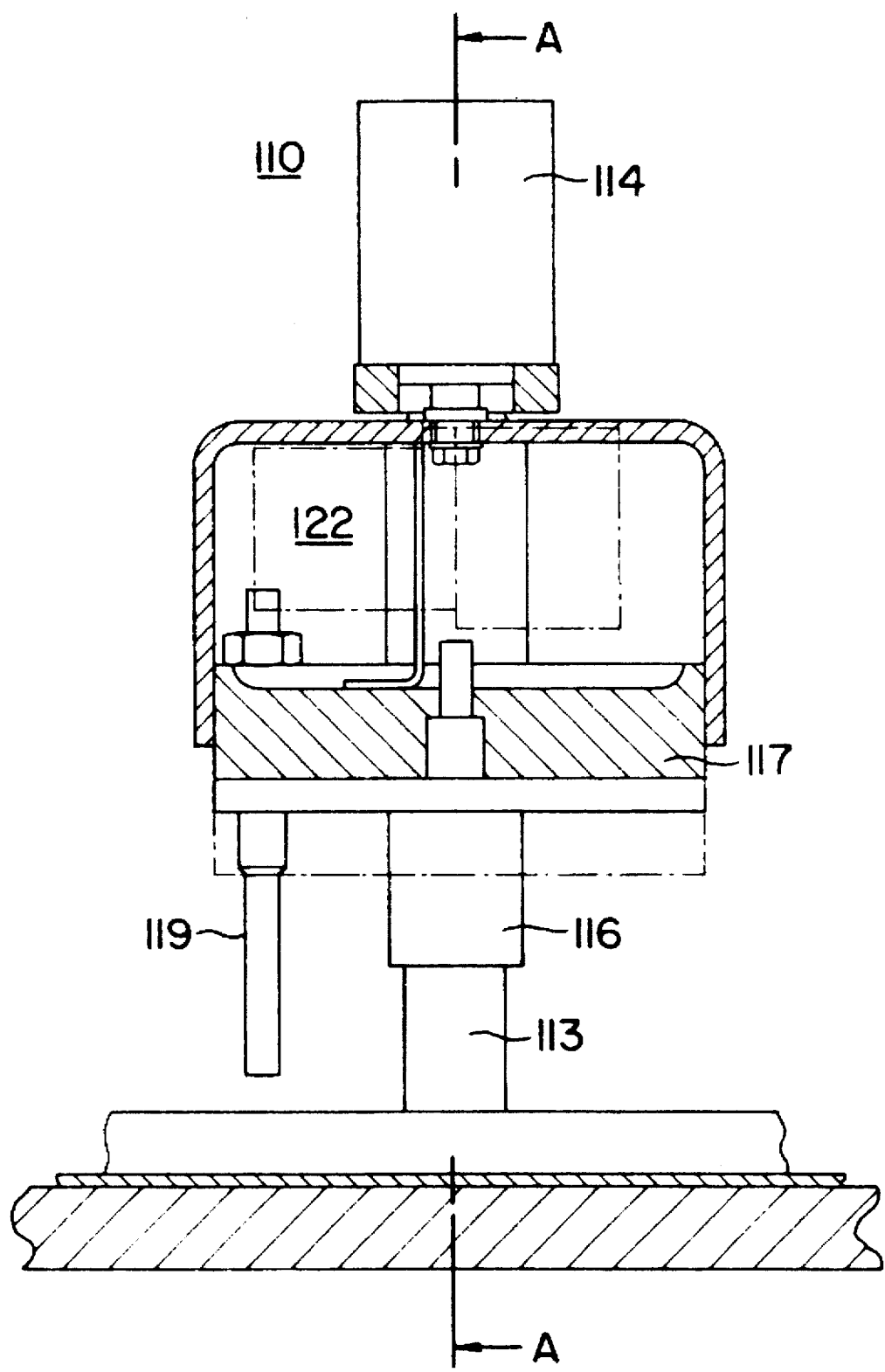
FIG. 33 is a side elevation view of the hydration extraction station of FIG. 32.

The extraction station illustrated in FIGS. 32 and 33 receives the second hydration carrier formed from a combination of the hydration base 860 and the top chamber plate 15 which form a plurality of hydration chambers therebetween as previously described and illustration in FIG. 10. Each of the second hydration carriers are indexed in a step wise manner down indexing conveyor path 101 by index drive 100. A plurality of extraction stations 110 are arranged on the path to receive the second hydration carriers, and periodically flush and exchange the deionized water therein to continue to leach the byproducts of hydration from the contact lenses 8 carried therein.

Each of the extraction stations 110 includes a stationary platform 111 supported on first and second columns 112,113 which serve as a support for pneumatic cylinder 114 and as reciprocating guides for collars 115,116 and a reciprocating platform 117 attached thereto. Reciprocating platform 117 includes a discharge nozzle 118 that supplies deionized water to the extraction station through flexible conduit 950, as regulated by the solenoid operated pinch valve 951 and control means 150. The deionized water is distributed by manifold 950 to the first and second water distribution systems as previously described with respect to FIGS. 34–36. A first distribution system provides thirty-two discharge outlets 945 which engage cavities 26 formed in the upper surface of top chamber plate 15 to provide a flow of fluid through port 22 of each of the convex lens carrier surfaces. Likewise, a second flow of fluid is supplied through nipples 947 to the upwardly extending couplings 863 to provide a flow of flushing fluid through the hydration base member manifold passageways and into ports 862 of each of the concave lens holding means 861.

As the second hydration carrier is indexed into position below the extraction station 110, the reciprocating platform 117 is lowered by pneumatic cylinder 114 to cause each of the fluid delivery ports 945,947 to engage the respective openings 26 in the top chamber plate 15 and the fluid supply nipple 863 of the hydration base. Simultaneously, an extraction nozzle 119 is lowered into sump 872 to extract the hydration fluid as it flows from the hydration chamber through the circumferential wall passageways 21 and into the collection troughs 870,871. Extraction nozzle 119 evacuates the fluid through suction line 121 which is also opened and closed by a solenoid operated pinch valve 122 by the hydration control circuitry 150.

While prior art hydration baths required 120 to 180 minutes to achieve satisfactory results, it has been found that a 5 to 10 minute cycle of cycled flushes and leaching will produce a lens with no detectable contaminants therein. In the preferred embodiment, a flush cycle of 24 seconds (with 1 to 2 seconds of actual flushing in the cycle) is provided for each extraction station 110, and the extraction stations are spaced from one another a distance corresponding to the width of three of the hydration base members 860. Thus, step wise indexing of the hydration base members results in a 1 to 2 second flush (in the 24 second dwell or flush period) and a 72 second leach cycle to provide maximum exchange of leachable materials from the lens. This cycle is repeated six times for a total of slightly more than 7 minutes, the total time for travel through the apparatus of the present invention, including the hydration tank time is approximately 15 minutes.

THE SEPARATION STATION

Figure 37:
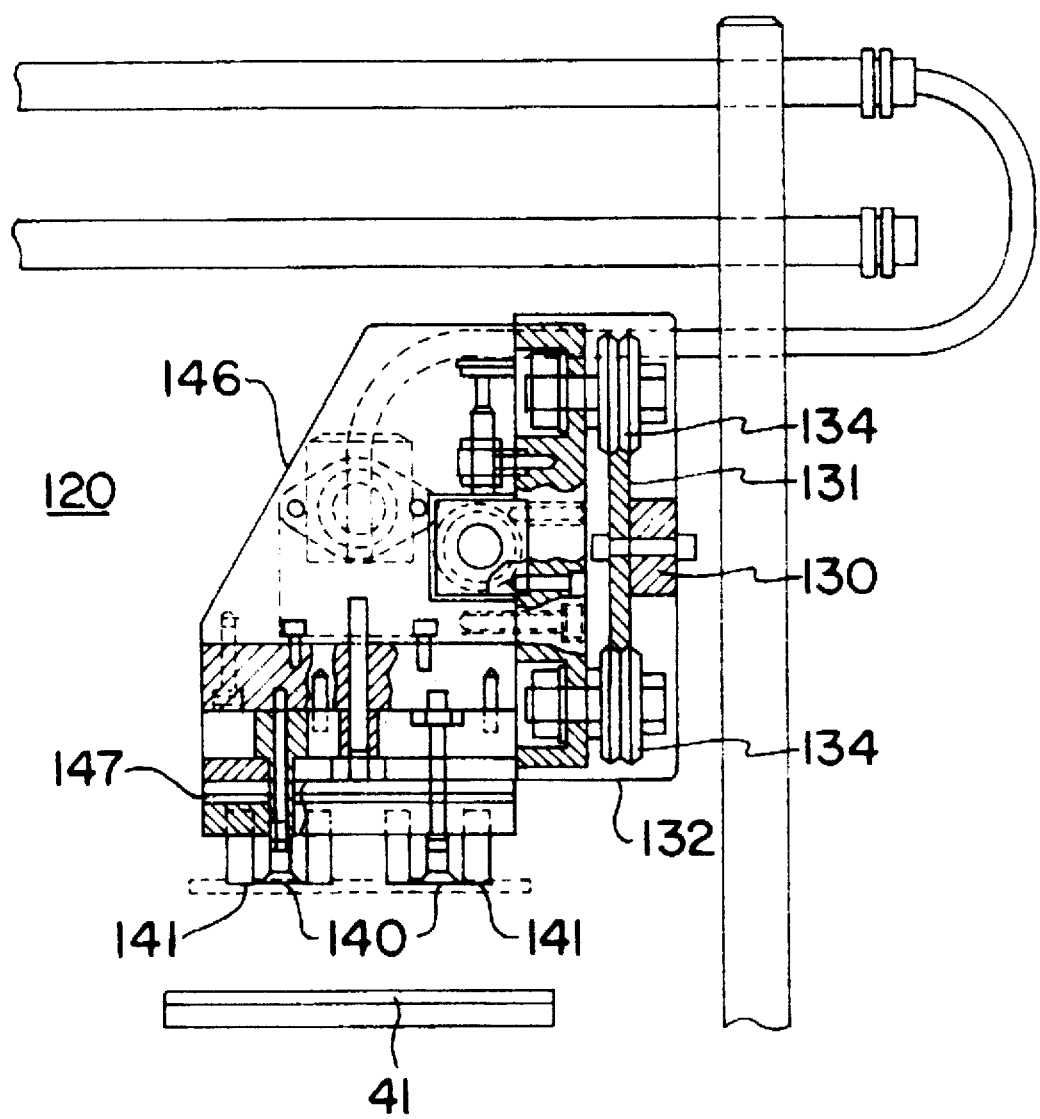
FIG. 37 is an elevation side view of the separation station utilized in the present invention.

The separation station 120 in the present invention is illustrated in FIGS. 37–39 wherein FIG. 38 represents a cross-section elevation end view, FIG. 37 represents a elevation side view of the traveling head of a fourth robotic assembly and FIG. 39 represents a sectional plan view of the assembly.

As illustrated in FIG. 8, the separation station 120 spans conveyor 101, and the second hydration carriers 23 as they arrive on conveyor track 101. FIG. 39 illustrates a single second hydration carrier 23, but it is understood that in operation, the hydration carriers abut one another as they traverse conveyor track 101. The separation station includes a fixed stationary tower 125 which is supported by columns 126,127 which have mounted thereon a vertically reciprocal carrier 128 which reciprocates on glide bearings, two of which are illustrated at 129. Reciprocating carrier 128 provides a support for a cantilevered beam 130, a guide track 131 and a housing member 132. Mounted for reciprocation on guide track 131 is a fourth robotic assembly including a reciprocal separation head 133 which traverses track 131 on four grooved rollers 134. The reciprocating separation station 133 reciprocates horizontally from a position over conveyor track 101 to the position illustrated in FIG. 38, in order to remove the top chamber plate 15 from the second hydration carrier and deposit it on a return conveyor 41. The reciprocating separation head 133 also reciprocates vertically with respect to conveyor surface 101 and 41 as carriage 128 is reciprocated up and down the guide tubes 126,127 by drive motor 135 which rotates a screw thread 136 to drive a screw follower 137 up and down the threaded rod 136, depending upon the direction of rotation of motor 135. The reciprocating carriage 128 is spring mounted to screw follower 137 by means of bellville washers 138 which act as springs when head 133 is in contact with the top chamber plate 15. A rodless cylinder 145, parallel to beam 130 and spaced therefrom, is used to drive the reciprocating separation head 133 along track 131 from a position directly over conveyor track 101 to the position over return conveyor 41, as illustrated in FIG. 38.

A vacuum line 139 is connected to eight separate vacuum cups 140 which extend through manifold 147 and engage the top chamber plate 15 in order to separate it from the hydration base 860. The vacuum is supplied by a pneumatic ejector while pressurized deionized water is supplied to manifold 147.

In operation, the pneumatic rodless cylinder 145 reciprocates the reciprocating separation head 133 to a position directly over conveyor track 101, and the reciprocating head is lowered into engagement with the second hydration carrier 23 by drive motor 135 and rotating screw 136. As the vacuum cups 140 engage the top chamber plate 15 of the second hydration carrier 23, a vacuum is drawn in the vacuum cups 140, thereby positively engaging the top chamber plate.

Simultaneously, deionized water is supplied to manifold 147, which in turn supplies pressurized water through each of the nozzles 141, through each of the upper openings 26 on the top chamber plate, through the ports 22 and into the hydration chamber formed between the top chamber plate and the hydration base. This supply of deionized water ensures that the contact lens is transferred to the concave lens holding means. The drive motor 135 is reversed, while deionized water is still flowing through ports 22, to lift the reciprocating separation head 133 and the top chamber plate 15. The top chamber plate is lifted, and the carriage reciprocated along the cantilever beam to the position illustrated in FIG. 38, wherein drive motor 135 is again reversed to drop the top chamber plate towards return conveyor 41. The vacuum line is then closed and the vacuum cups release the top chamber plate to conveyor 41 for return to the first robotic assembly 40.

After separation, the hydration base member 860, having a contact lens in each of the concave lens retaining means 861, is reciprocated along path 101 as illustrated in FIG. 1 to the hand-off position 120(a) wherein the individual contact lenses are removed by a robotic transfer device 160. After the lenses are removed, a pneumatic cylinder 170 is actuated to drive push arm 171 into engagement with the hydration base member 860 and return it to the return conveyor 41. Return conveyor 41 conveys the hydration base member back to indexing mechanism 100 and arm 150 which pulls the hydration base member from the return conveyor belt 41 as hereinbefore previously described.

While the invention has been particularly shown and described with respect to the preferred embodiments thereof, it will be understood by those skilled in the art that the foregoing and other changes in form and details made therein without departing from the spirit and scope of the invention, which is limited only by the scope of the following claims.

We claim:

1. An automated method for hydrating a molded hydrophilic contact lens, said automated method comprising:
    (a) removing a plurality of contact lens molds from at least one carrier, each mold having a contact lens therein, and automatically assembling said molds with a lens transfer plate to form a first hydration carrier;
    (b) immersing said first hydration carrier in a hydration bath at a speed not exceeding 40 mm per second with robotic handling to hydrate the lens and release said lens from said mold, and allow each of said lenses to transfer from its respective mold to a related lens transfer surface carries by said first hydration carrier,
    (c) removing said first hydration carriers from said bath with robotic handling after said transfer;
    (d) removing said molds from said lens transfer plate and transporting said lens transfer plate and said lenses to a subsequent processing station.

2. An automated method as claimed in claim 1 wherein said molds are removed from said at least one carrier by a registering a lens transfer plate at a first location and placing it on a plurality of contact lens molds carried by one or more pallet carriers.

3. An automated method as claimed in claim 2, which further includes the step of engaging each of said individual contact lens molds with at least one clip mounted on said lens transfer plate which secures said molds to said transfer plate during transport thereof.

4. An automated method as claimed in claim 1, wherein said method further includes the step of securing the lens to said transfer surface with surface tension during said transport step.

5. An automated method as claimed in claim 3, wherein said lens transfer plate further includes a pair of clips for engaging each of said individual contact lens molds, and securing each of said molds to a predefined position adjacent said related lens transfer surface.

6. An automated method as claimed in claim 5, wherein said lens transfer surface is convex and generally conforms to a concave surface of a contact lens to enable said convex lens transfer surface to hold a contact lens with surface tension.

7. An automated method as claimed in claim 1, wherein said first hydration carrier is immersed in said hydration bath at a predetermined angle.

8. An automated method as claimed in claim 1, wherein said first hydration carrier is immersed in said hydration bath at a predetermined angle.

9. An automated method as claimed in claim 1, wherein said first hydration carrier is inverted and then immersed in said hydration bath with the contact lens molds positioned above the related lens transfer surface.

10. An automated method as claimed in claim 9, wherein said first hydration carrier is immersed at a predetermined angle of 45° from the surface of the hydration bath, ±20°.

11. An automated method as claimed in claim 1, wherein said the temperature of the hydration bath is maintained at a predetermined temperature ranging from 55° C. to 90° C.

12. An automated method as claimed in claim 11, wherein said predetermined temperature is 70° C.

13. An automated method as claimed in claim 1, wherein said hydration bath is a bath of deionized water with a surfactant therein.

14. An automated method as claimed in claim 13, wherein said surfactant ranges from 0.005% to 5% of said hydration bath.

15. An automated method as claimed in claim 1, wherein said removal step further includes the step of engaging said lens transfer plate with a reciprocating robotic handling device which reciprocates a plurality of ejectors through a plurality of openings designed by said lens transfer plate adjacent said molds, thereby dislodging said molds for said lens transfer plate.

16. An automated method as claimed in claim 1 wherein said hydration carrier is removed from said hydration bath at a speed that does not exceed 24 cm/sec.

17. An automated method as claimed in claim 1 wherein said hydration carriers are transported through the hydration bath with intermittent motion.

18. An automated method as claimed in claim 1, which further includes the step of introducing a fluid between each of said lens transfer surface and said lenses to release the lenses from the related lens transfer surfaces and transfer each of said lenses to a related concave holding surface for transport through subsequent processing stations.

19. An automated method as claimed in claim 18 which further includes the step of combining each said concave lens holding surfaces with a second lens transfer surface to form a second hydration carrier.

20. An automated method as claimed in claim 19, wherein said method further includes a plurality of extraction steps for intermittently flushing said second hydration carriers to flush the by-products of hydration from said carriers.

21. An automated method as claimed in claim 20, wherein said automated method further comprises the steps of intermittently advancing each of said second hydration carriers through a plurality of extraction stations for said extraction steps.

22. An automated method as claimed in claim 21, wherein said automated method sequences the transport and extraction steps with a digital controller.

23. An method apparatus for hydration a hydrophilic lens as claimed in claim 20 wherein fresh deionized water is introduced into said hydration carriers at each extraction station to flush leachable substances from the hydrating chambers.

24. An automated method as claimed in claim 23 wherein said method further includes an incremental residence time between each of said extraction stations to leach impurities from said contact lens through mass transfer exchange.

25. An automated method as claimed in claim 24 wherein an automatic digital controller controls said incremental reisdence time and the duration of the flow of deionized water through each hydration chamber.

26. An automated method as claimed in claim 25 wherein said total incremental residence time of said leach cycles is slightly more than seven minutes.

27. An automated method as claimed in claim 26 wherein the incremental residence time of a single leach cycle is approximately 72 seconds.

28. An automated method as claimed in claim 20 wherein said method further comprises the step of separating said second lens transfer surface from said concave lens holding surface while supplying a fluid to a port defined in said second lens transfer surface to ensure transfer of said lens to said concave lens holding surface prior to separation of said second hydration carrier.

* * * * *